(12) United States Patent
Pryor

(10) Patent No.: US 12,276,100 B2
(45) Date of Patent: Apr. 15, 2025

(54) KNIFE PLATE FASTENER

(71) Applicant: Simpson Strong-Tie Company Inc., Pleasanton, CA (US)

(72) Inventor: Steven E. Pryor, Dublin, CA (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 0 days.

(21) Appl. No.: 16/923,379

(22) Filed: Jul. 8, 2020

(65) Prior Publication Data

US 2022/0010547 A1 Jan. 13, 2022

(51) Int. Cl.
*E04B 1/48* (2006.01)
*E04B 1/92* (2006.01)
*E04H 9/02* (2006.01)

(52) U.S. Cl.
CPC ............... *E04B 1/486* (2013.01); *E04B 1/92* (2013.01); *E04H 9/021* (2013.01)

(58) Field of Classification Search
CPC ........ E04B 1/92; E04B 1/2612; E04B 1/2608; E04B 1/2604; E04H 9/021; F16B 9/052; F16B 9/058; F16B 9/05
USPC ............................... 52/712, 714, 715, 167.1
See application file for complete search history.

(56) References Cited

U.S. PATENT DOCUMENTS

| | | | | |
|---|---|---|---|---|
| 662,235 A * | 11/1900 | Hornbeck | ............. | B60T 17/046 248/300 |
| 1,346,131 A * | 7/1920 | Marqua | .................... | F16B 9/052 403/187 |
| 2,477,163 A * | 7/1949 | Barnett | .................... | F16B 9/052 403/205 |
| 3,310,268 A * | 3/1967 | Kramer | .................. | A47C 17/68 248/188 |
| 3,423,898 A * | 1/1969 | Coloney | ................. | E04B 7/063 D25/17 |
| 4,007,573 A * | 2/1977 | Gilb | ........................ | E04C 3/292 52/696 |
| 4,148,164 A * | 4/1979 | Humphrey | ............ | E04D 13/158 52/712 |

(Continued)

FOREIGN PATENT DOCUMENTS

| EP | 3318684 | 5/2018 |
|---|---|---|
| EP | 3578724 | 12/2019 |

(Continued)

OTHER PUBLICATIONS

International Search Report and Written Opinion dated Oct. 29, 2021 in International Patent Application No. PCT/US2021/040566.

(Continued)

*Primary Examiner* — Brian E Glessner
*Assistant Examiner* — Adam G Barlow
(74) *Attorney, Agent, or Firm* — Pearl Cohen Zedek Latzer Baratz LLP

(57) ABSTRACT

A connector referred to herein as a knife plate, and the structural connections formed using the knife plate. The knife plate may have a first portion configured to affix to a first structural member, such as a vertical column. The knife plate may have a second portion configured to fit within a slot formed in a second structural member, such as a horizontal beam. The second structural member may be pinned to the knife plate using one or more dowels fit through the second structural member and the knife plate.

39 Claims, 22 Drawing Sheets

(56) References Cited

U.S. PATENT DOCUMENTS

| | | | | |
|---|---|---|---|---|
| 4,423,977 A * | 1/1984 | Gilb | F16B 9/058 | 52/702 |
| 4,447,030 A * | 5/1984 | Nattel | H02G 3/125 | D8/349 |
| 4,501,033 A * | 2/1985 | Kessel | F16B 9/058 | 403/4 |
| 4,525,972 A * | 7/1985 | Palacio | F16B 9/052 | 52/643 |
| 4,817,359 A * | 4/1989 | Colonias | F16B 9/058 | 52/643 |
| 4,893,961 A * | 1/1990 | O'Sullivan | E04B 1/2608 | 403/231 |
| 4,949,929 A * | 8/1990 | Kesselman | F16B 12/46 | 248/300 |
| 5,004,369 A * | 4/1991 | Young | E04B 7/063 | 403/402 |
| 5,042,217 A * | 8/1991 | Bugbee | F16B 9/058 | 52/643 |
| 5,598,680 A * | 2/1997 | Wilhelmi | E04B 1/2608 | 403/231 |
| 5,617,694 A * | 4/1997 | Baba | E04B 1/2604 | 403/174 |
| 5,810,303 A * | 9/1998 | Bourassa | H02G 3/126 | 248/300 |
| 6,032,431 A * | 3/2000 | Sugiyama | F16B 9/058 | 403/258 |
| D431,770 S * | 10/2000 | Willet | D8/354 | |
| D434,304 S * | 11/2000 | Willett | D8/354 | |
| 6,240,682 B1 * | 6/2001 | James | E04B 7/024 | 52/90.2 |
| 6,254,306 B1 * | 7/2001 | Williams | E04B 1/2403 | 403/403 |
| 6,298,630 B1 * | 10/2001 | VeRost | E04B 1/4121 | 52/645 |
| 6,612,087 B2 * | 9/2003 | diGirolamo | E04B 9/008 | 52/712 |
| 6,629,391 B1 * | 10/2003 | Borresen et al. | E04D 13/031 | 52/712 |
| 6,698,971 B1 * | 3/2004 | Wilhelmi | E04B 1/2608 | 52/712 |
| 6,712,323 B1 * | 3/2004 | Cheung | G10G 3/00 | 248/300 |
| 7,104,024 B1 * | 9/2006 | diGirolamo | E04B 2/96 | 403/231 |
| 7,810,770 B2 * | 10/2010 | Treadwell | A47B 47/027 | 248/300 |
| 7,913,472 B2 * | 3/2011 | Troth | E04B 7/063 | 52/696 |
| 7,918,054 B2 * | 4/2011 | Grafton | E04D 3/3608 | 248/300 |
| 8,066,242 B2 * | 11/2011 | Potter | H02G 3/26 | 29/559 |
| 8,833,030 B2 * | 9/2014 | Zimmerman | F16B 9/052 | 248/300 |
| 8,975,519 B2 * | 3/2015 | Lalancette | H05K 5/0204 | 248/300 |
| 9,920,531 B1 | 3/2018 | Charest | E04C 3/12 | |
| D814,905 S * | 4/2018 | Ralph | D8/349 | |
| D815,313 S * | 4/2018 | Ralph | D25/199 | |
| D815,314 S * | 4/2018 | Ralph | D25/199 | |
| 10,246,876 B2 * | 4/2019 | Brean | E04B 7/163 | |
| 10,422,123 B2 * | 9/2019 | Holland | E04B 1/486 | |
| 11,137,010 B2 * | 10/2021 | Muhn | F16B 15/0046 | |
| 2002/0025217 A1 * | 2/2002 | Mattle | F16B 25/10 | 403/294 |
| 2004/0079034 A1 * | 4/2004 | Leek | E04B 1/2608 | 52/713 |
| 2005/0279901 A1 * | 12/2005 | McCoy | E04B 2/82 | 248/300 |
| 2007/0186503 A1 * | 8/2007 | Homma | E04B 1/2604 | 52/712 |
| 2008/0277551 A1 * | 11/2008 | Hackney | E04B 1/2604 | 248/276.1 |
| 2009/0113839 A1 * | 5/2009 | Carr | E04B 1/2612 | 52/712 |
| 2011/0219720 A1 * | 9/2011 | Strickland | E04B 5/10 | 52/655.1 |
| 2014/0263907 A1 * | 9/2014 | Mason | G06F 1/187 | 248/300 |
| 2018/0127971 A1 * | 5/2018 | Holland | E04B 1/486 | |
| 2018/0141233 A1 | 5/2018 | Charest | | |
| 2018/0334801 A1 * | 11/2018 | Brean | E04B 7/045 | |
| 2020/0109556 A1 | 4/2020 | Pryor | | |
| 2021/0340754 A1 * | 11/2021 | Brekke | E04B 1/2608 | |

FOREIGN PATENT DOCUMENTS

| | | |
|---|---|---|
| JP | 1999190066 | 7/1999 |
| JP | 2015194055 | 11/2015 |
| JP | 2018087419 | 6/2018 |
| JP | 2021025277 | 2/2021 |
| NZ | 264341 | 7/1996 |
| WO | 2011125732 | 10/2011 |

OTHER PUBLICATIONS

English language Abstract for WO2011125732 published Oct. 13, 2011.
Office Action dated Jun. 12, 2024 in Canadian Patent Application No. 3189068.
Office Action dated Jan. 9, 2024 in Japanese Patent Application No. 2023-501241.
English language Abstract for JP2018087419 published Jun. 7, 2018.
English language Abstract for JP2015194055 published Nov. 5, 2015.
English language Abstract for JP1999190066 published Jul. 13, 1999.
English language Abstract for JP2021025277 published Feb. 22, 2021.
Examination Report dated Feb. 29, 2024 in Australian Patent Application No. 2021305164.
Response to Office Action dated Oct. 15, 2024, in Canadian Patent Application No. 3189068.
Office Action dated Oct. 22, 2024 in Japanese Patent Application No. 2023-501241.
Response to Office Action dated Jul. 9, 2024, with English translation of claims as amended therein, in Japanese Patent Application No. 2023-501241.
Examination Report dated Jul. 30, 2024 in New Zealand Patent Application No. 796179.

* cited by examiner

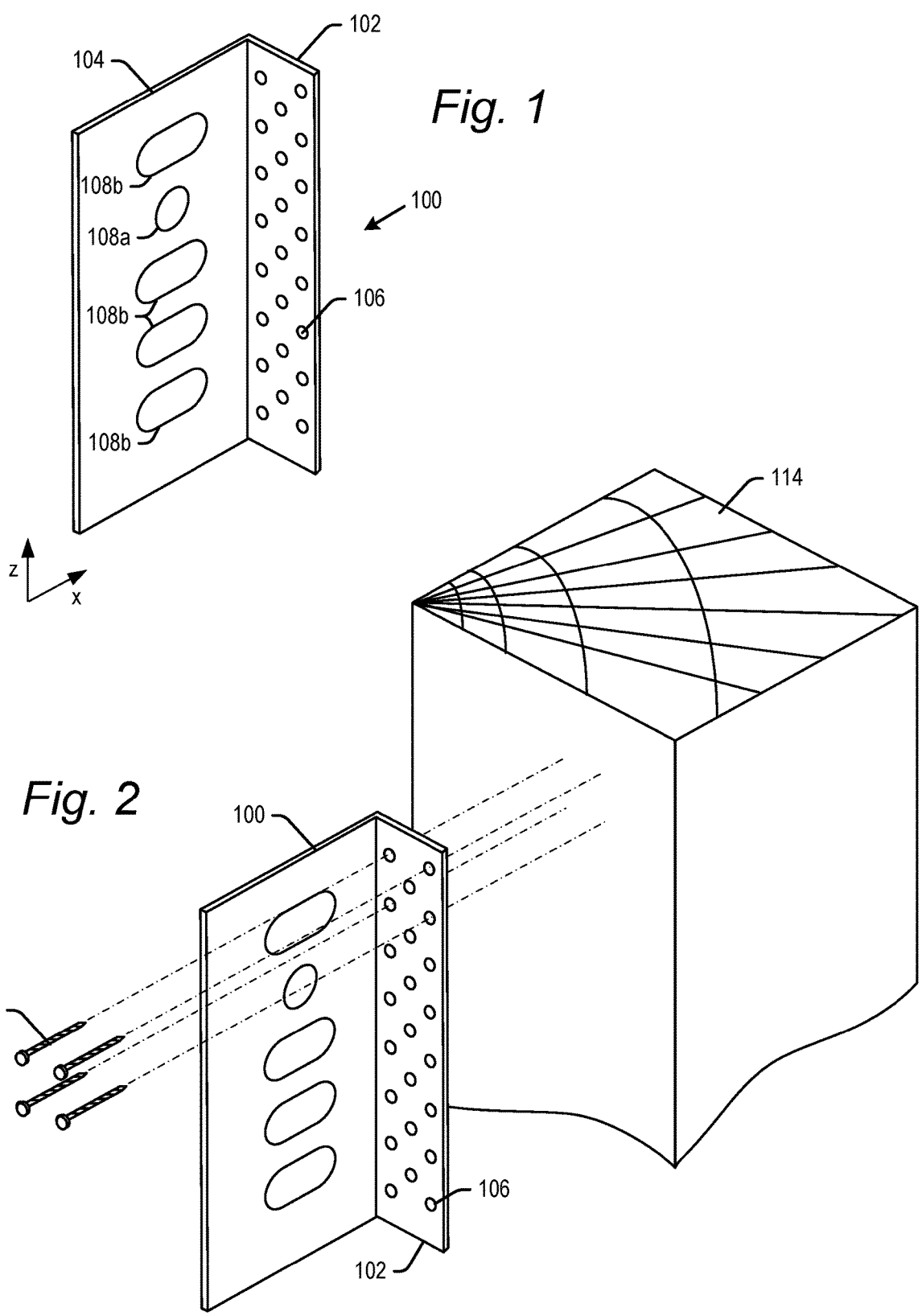

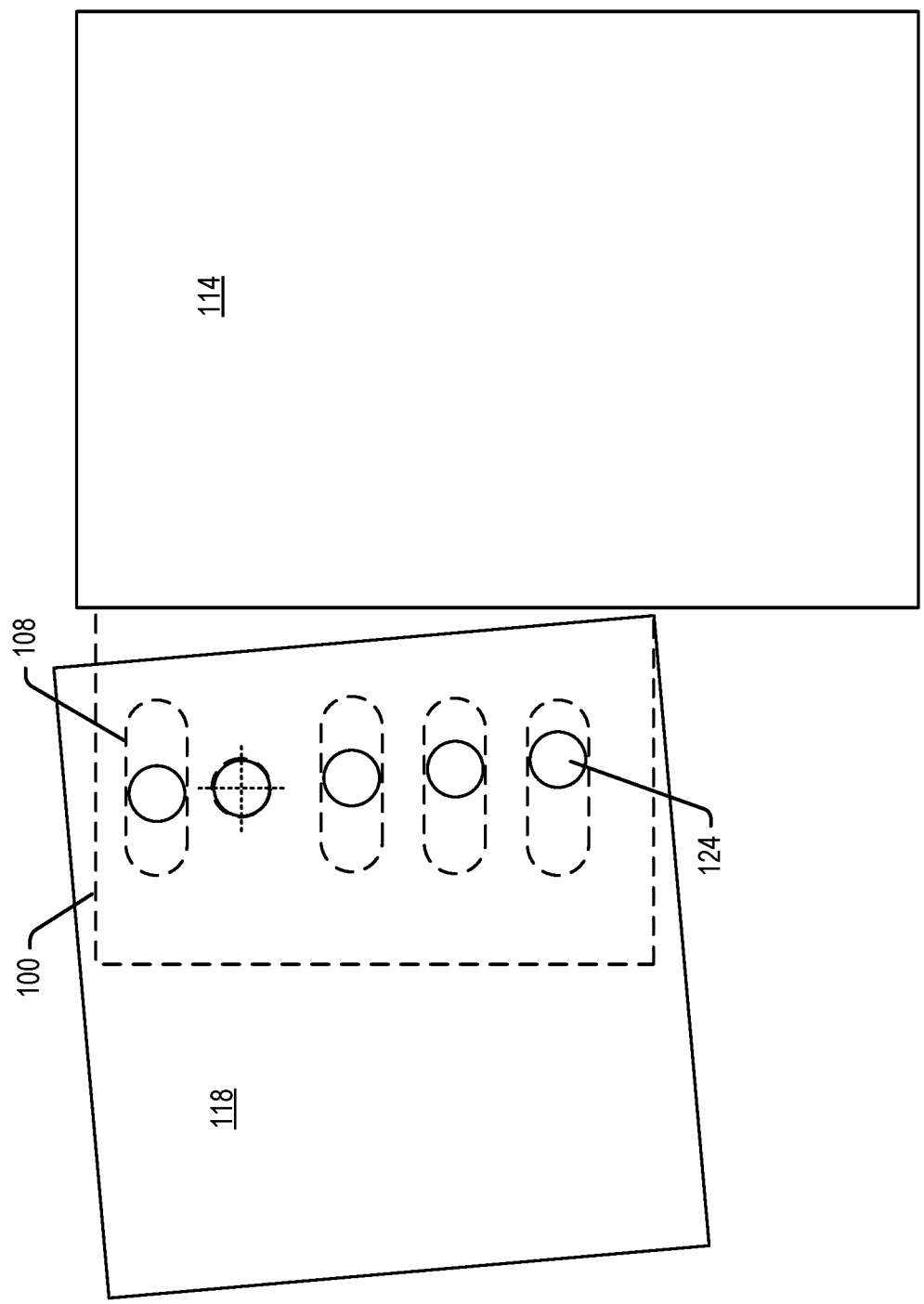

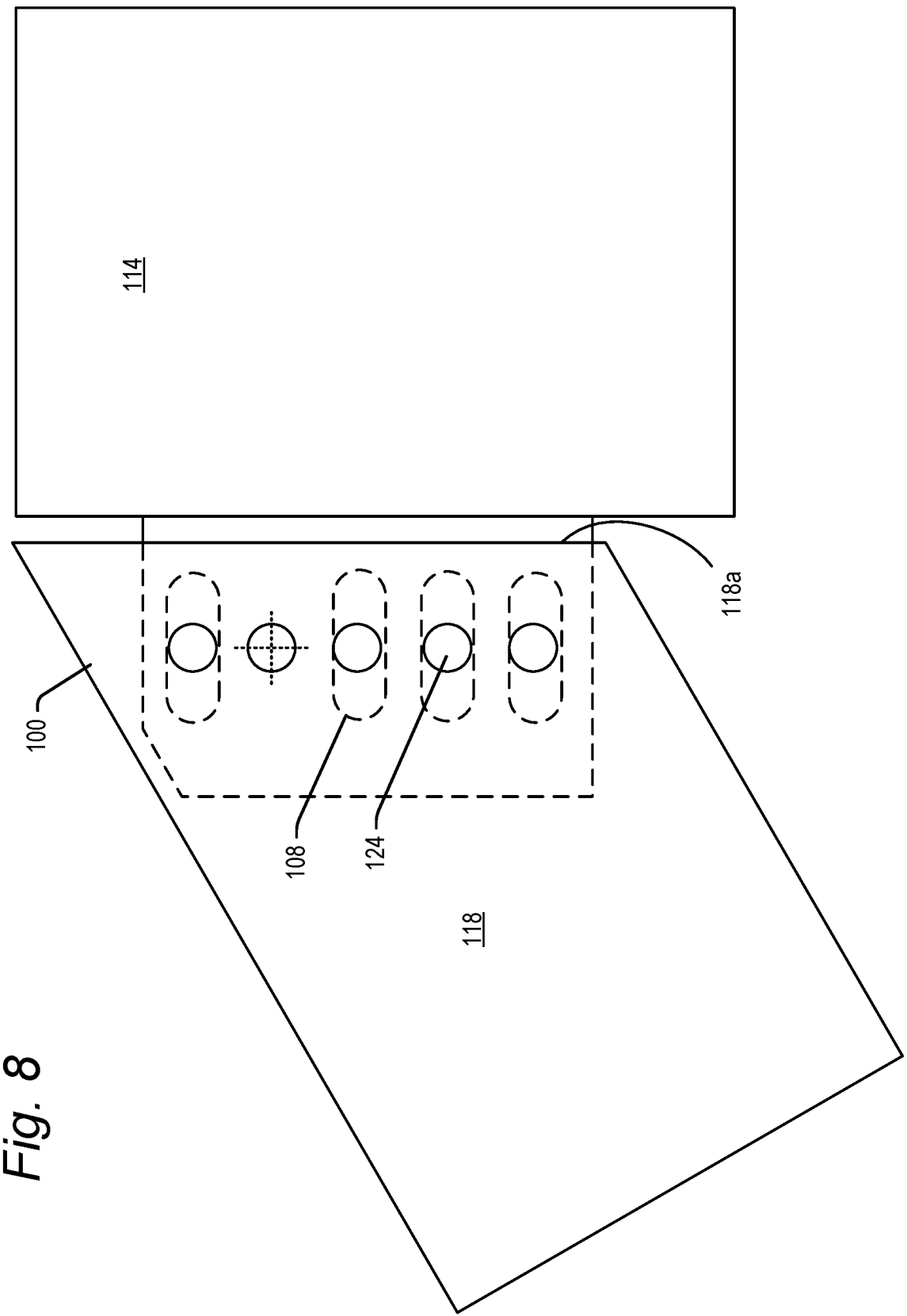

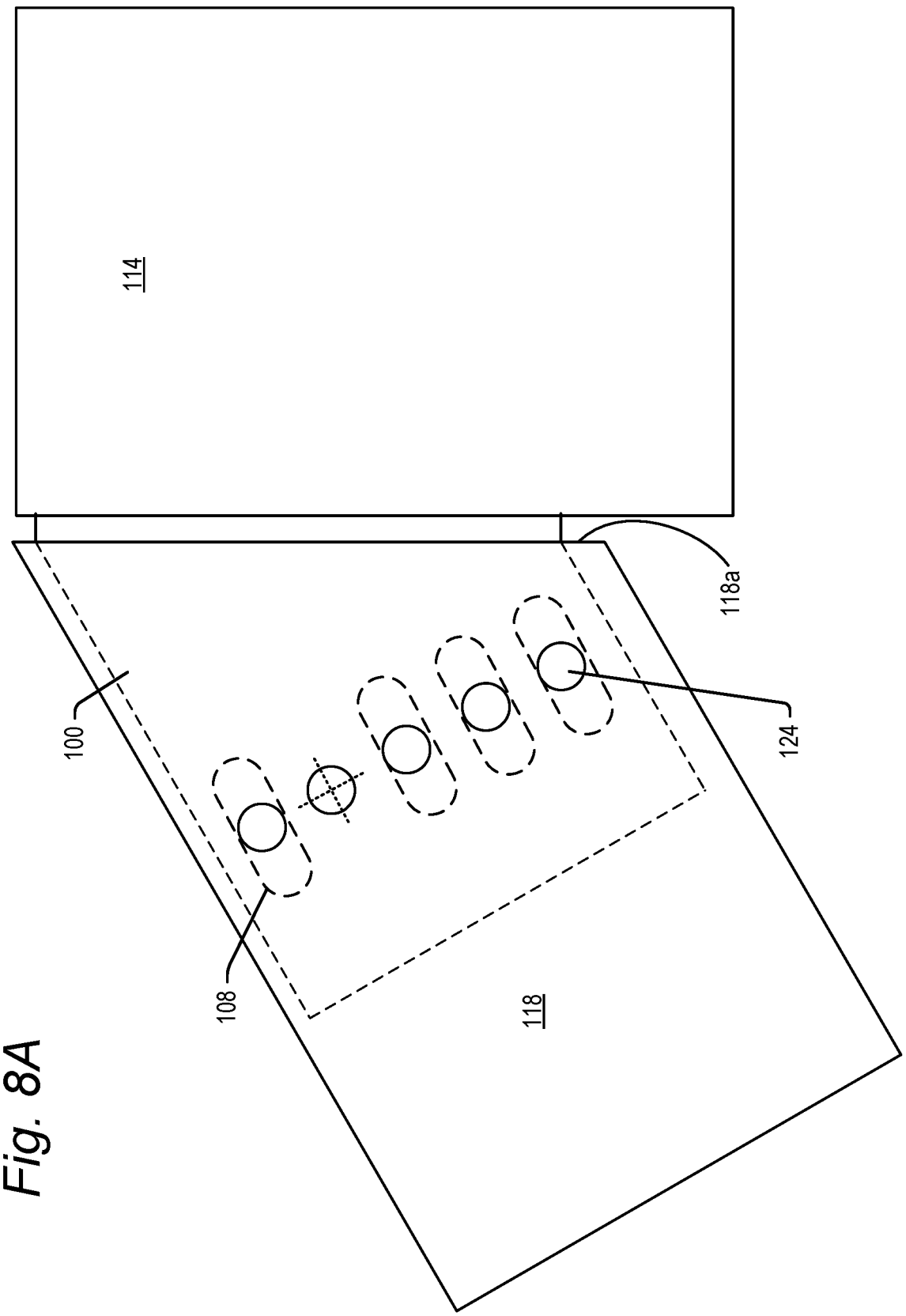

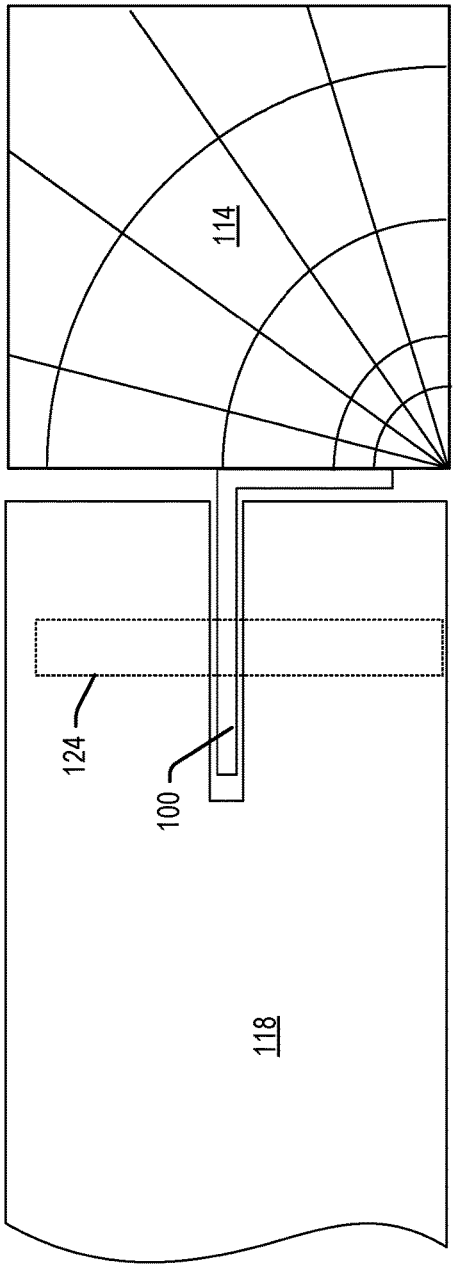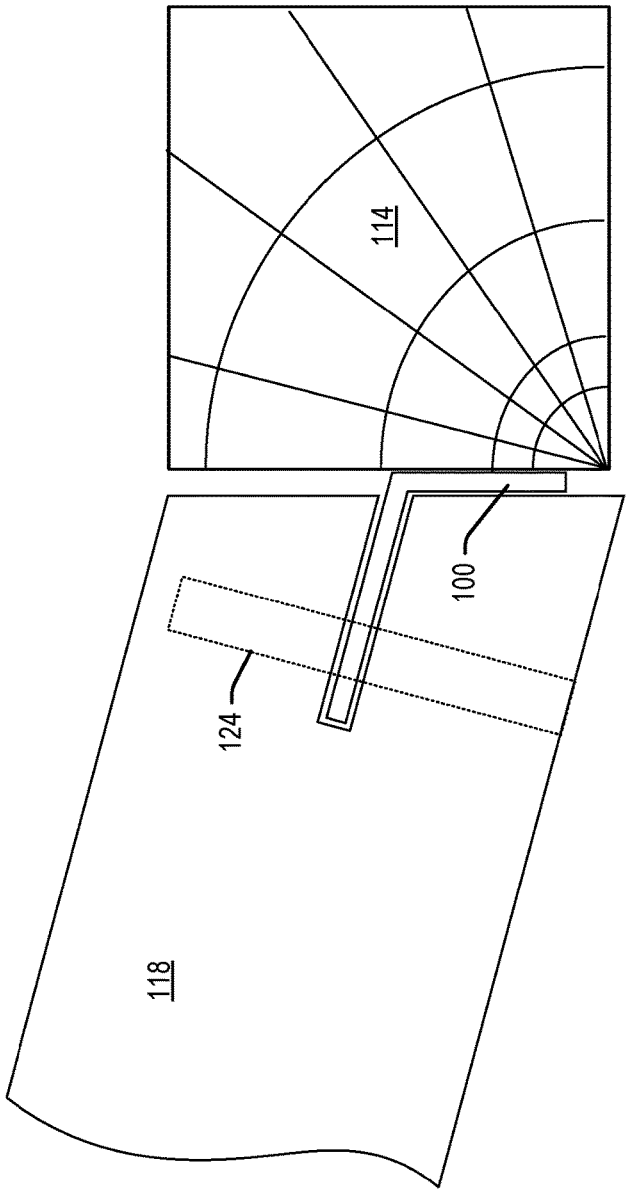

KNIFE PLATE FASTENER

BACKGROUND OF THE INVENTION

Field of the Invention

The present invention is directed to an improved construction device, and specifically an improved pinned connection for joining structural members.

Description of the Related Art

Shear stresses due to natural phenomena such as seismic activity and high winds can have devastating effects on the structural integrity of light-framed constructions. Lateral forces generated during such natural phenomena may cause the top portion of a wall to move laterally with respect to the bottom portion of the wall, which movement can result in damage or structural failure of the wall and, in some instances, collapse of the building.

In constructions such as residences and small buildings, lateral bracing systems have been developed to counteract the potentially devastating effects of shear stress on the structural integrity of light-framed constructions. Although various designs are known, one type of lateral bracing system includes vertical studs spaced from each other and horizontal beams affixed to and extending between the studs. The beams are affixed to the studs in a manner aimed at increasing structural performance of the connection under lateral loads.

Many conventional lateral bracing systems perform well initially under lateral loads, but yield and fail upon the repetitive lateral loads which often occur during significant seismic activity and high winds. Upon appreciable yield or failure of the lateral bracing system, the entire system must be replaced.

Another consideration unrelated to loading of structures is the ease and effectiveness with which such structures may be erected by crews at a worksite. One task which adds to the time, complexity and cost of constructions is having to weld components together at the worksite.

SUMMARY OF THE INVENTION

The present technology, roughly described, relates to a connector referred to herein as a knife plate, and the structural connections formed using the knife plate. The knife plate may have a first portion configured to affix to a first structural member, such as a vertical column. The knife plate may have a second portion configured to fit within a slot formed in a second structural member, such as a horizontal beam. The second structural member may be pinned to the knife plate using one or more dowels fit through the second structural member and the knife plate.

In one example, the present technology relates to a system for securing a first structural member to a second structural member in a construction, comprising: a first section configured to be affixed to the first structural member; and a second section, formed at an angle to the first section, and configured to be inserted into a slot in the second structural member and to receive one or more dowels through one or more holes in the second section and the second structural member, the second section and one or dowels configured to support the second structural member on the first structural member without transferring moment, or rotational, forces from second structural member onto the first structural member.

In another example, the present technology relates to a system within a construction, comprising: a first structural member; a second structural member comprising a slot and one or more holes; a knife plate for pinning the first and second structural members to each other, the knife plate comprising: a first section configured to be fastened to the first structural member, and a second section configured to fit within the slot in the second structural member and comprising at least one hole; and one or more dowels configured to fit through the one or more holes in the second structural member and the at least one hole in the second section, the one or more dowels configured to pin the second structural member to the knife plate and first structural member.

In a further example, the present technology relates to a system within a construction, comprising: a first structural member; a second structural member comprising multiple holes; a knife plate for pinning the first and second structural members to each other, the knife plate comprising: a first section configured to be fastened to the first structural member, and a second section comprising a plurality of holes, the plurality of holes comprising a circular hole and one or more oblong holes; and a plurality of dowels configured to fit through the multiple holes in the second structural member and the plurality of holes in the second section, the plurality of dowels in the multiple holes and plurality of holes supporting the second structural member on the knife plate and first structural member while allowing rotation of the second structural member relative to the knife plate and first structural member.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 1 depicts a perspective view of a knife plate in accordance with embodiments of the present technology.

FIG. 2 depicts a perspective view of a knife plate being affixed to a first structural member in accordance with embodiments of the present technology.

FIGS. 6 and 7 depict front views of a first structural member pivoting relative to a second structural member while affixed to each other by a knife plate in accordance with embodiments of the present technology.

FIGS. 8 and 8A depict a front view of first and second structural members affixed to each other by a knife plate in accordance with an alternative embodiment of the present technology.

FIG. 9 depicts a top view of first and second structural members affixed to each other by a knife plate in accordance with embodiments of the present technology.

FIG. 10 depicts a top view of first and second structural members affixed to each other by a knife plate in accordance with an alternative embodiment of the present technology.

DETAILED DESCRIPTION

Figure 3:
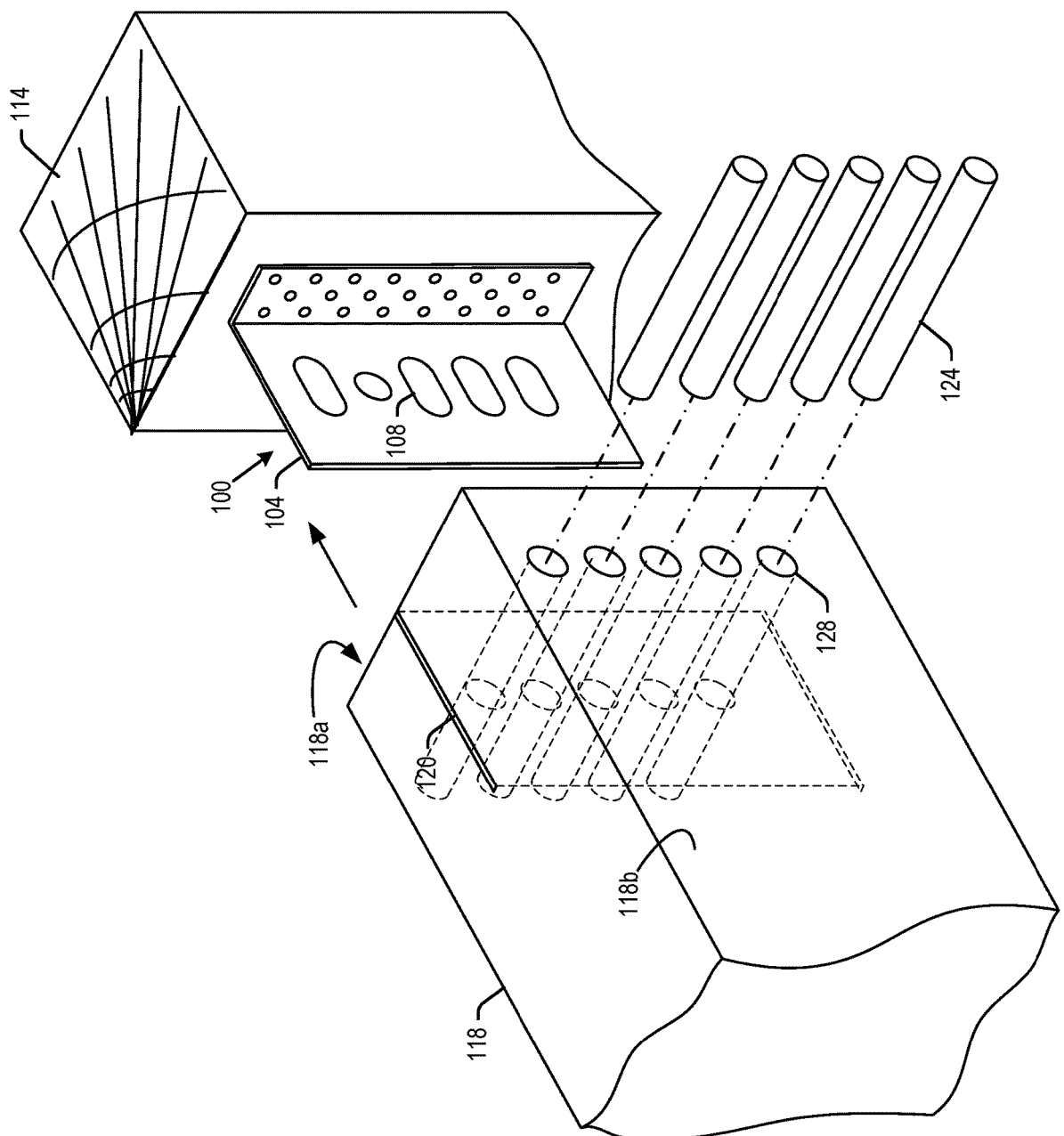
FIG. 3 depicts a perspective view of a knife plate being affixed to a second structural member in accordance with embodiments of the present technology.

The present technology will now be described with reference to the figures, which in general show a connector, and the structural connections formed using the connector. The connector may be referred to herein as a knife plate. In one embodiment, the knife plate may have a first portion configured to affix to a first structural member, such as a vertical column. The knife plate may have a second portion configured to fit within a slot formed in a second structural member, such as a horizontal beam. The second structural member may be pinned to the knife plate using one or more dowels fit through the second structural member and the knife plate.

Pinning of the second structural member to the first structural member using one or more dowels serves to anchor the second structural member to the first structural member against axial and gravitational forces on the second structural member. However, the pinned connection prevents transfer of moment forces from the second structural member to the first structural member. The advantage is that during earthquakes and other shear force events, the connection is not damaged by the rotations that happen between the first and second structural members.

In embodiments, the knife plate may be used in wood structures where for example the first structural member is a wooden column and the second structural member is a wooden beam. However, it is understood that the first and second structural members may be any of a wide variety of members that may be connected to each other in a light-framed construction. Such members further include joists, studs, girders, chords, trusses, shear walls and frames. Moreover, while natural lumber in embodiments, the first and/or second structural members may be composite wood, engineered lumber or metal in further embodiments.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±2.5%.

FIG. 1 is a perspective view of an embodiment of a knife plate connector 100. The knife plate 100 may include a first section 102 formed at an angle with a second section 104. In embodiments, the angle between the first and second sections may be 90°, though it may be other angles in further embodiments. The first section may have a length of 10 inches and a width of 2 inches. The second section may be a length of 10 inches and a width of 4.6 inches. Each of these dimensions may vary in further embodiments, either proportionally or disproportionally to each other. In embodiments, the knife plate may be 0.25 inch thick steel, though it may be other thicknesses and materials in further embodiments. The knife plate 100 may be a single piece, bent into the first and second sections, 102, 104. In further embodiments, the first and second sections may be separate pieces, welded or bolted together to form the knife plate. The first and second sections 102, 104 may be connected by other mechanical connections in further embodiments, including for example the Tog-L-Loc® system from the BTM Company, Michigan, USA.

The first section 102 may include holes 106 and the second section may include holes 108 for fasting the first and second structural members to the knife plate and each other as explained below.

Referring now to FIG. 1 and the perspective view of FIG. 2, the first section 102 may be formed with a pattern of holes 106, for receiving fasteners 110 to affix the knife blade 100 to the first structural member 114. In embodiments, the first structural member 114 may be vertical and mounted to a building foundation or floor supports. While only a few fasteners 110 are shown, there may be one fastener 110 placed into each hold 106. The fasteners may be screws such as for example the ¼ inch diameter high-strength Strong-Drive SDS Connector screw from Simpson Strong-Tie, Pleasanton, Calif. Other types of fasteners may be used. All of the holes 106 may be the same size, but the holes 106 may be different sizes to receive fasteners 110 of different types and sizes in further embodiments to fasten the knife plate 100 to the first structural member 114.

The knife plate 100 may be affixed to the first structural member at the construction site or before the first structural members arrive at the construction site. In one example, a first section of 20 sq. inches may have 18 fasteners 106, arranged in three staggered columns on the first section. However, the number and pattern of holes 106 may vary in further embodiments.

Once the knife plate 100 is affixed to the first structural member 114, the second structural member 118 may be affixed to the knife plate 100 and first structural member 114 as shown in the exploded perspective view of FIG. 3. In embodiments, a slot 120 is formed in an end face 118a of the second structural member 118. The slot 120 may extend though the full height of the structural member 118 so as to be formed vertically through the top and bottom surfaces of member 118 in addition to the end face 118a. The slot 120 need not extend to the top and/or bottom surfaces of member 118 in further embodiments.

The slot 120 may just wide enough to receive the second section 104 of knife plate 100. The slot 120 may be formed deep enough (in a dimension perpendicular to end face 118a) to receive the entire second section 104. Thus, the second structural member 118 may be joined to the first structural member 114 by inserting the second structural member 118 over the second section 104 until the end face 118a is adjacent the first structural member 114. In embodiments, after being fastened as explained below, the end face 118a may be spaced 0.25 inches to 1 inch away from the first structural member 114. This spacing allows pivoting of the second structural member relative to the first structural member, as is also explained below. The spacing may be larger or smaller than that in further embodiments.

Referring now to the perspective view of FIG. 3 once the second section 104 is positioned within slot 120, the second member 118 may be fastened to the knife plate 100 and first member 114 by means of dowels 124 fitting through holes 108 in the knife plate 100, and holes 128 formed through the second structural member 118 adjacent to the end face 118a. In particular, holes 128 may be formed through the second structural member 118 with axes perpendicular to a side surface 118b of the second member 118. The holes 128 may match in number and position to the holes 108 formed in the second section 104, but are round instead of oblong, as explained below. The term 'dowel' as used herein to refer to element 124 may be broadly construed to include cylindrical shaped objects such as but not limited to dowels, rods, pins, pegs, shafts and tubes. In embodiments, the dowels 124 do not include heads, but may include heads in further embodiments, including screws, nails and bolts.

Figure 4:
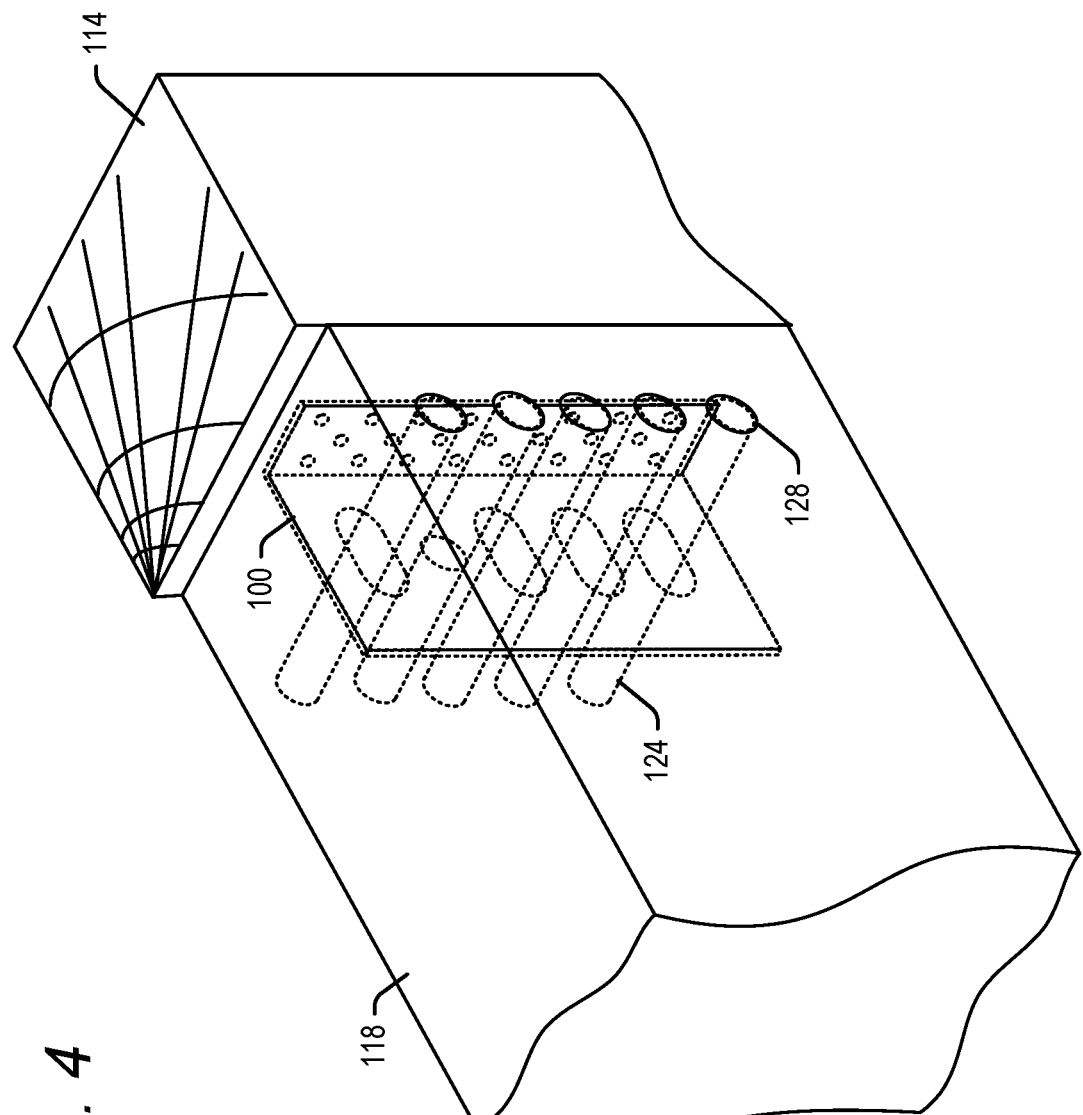
FIG. 4 depicts a perspective view of first and second structural members affixed to each other by a knife plate in accordance with embodiments of the present technology.
Figure 5:
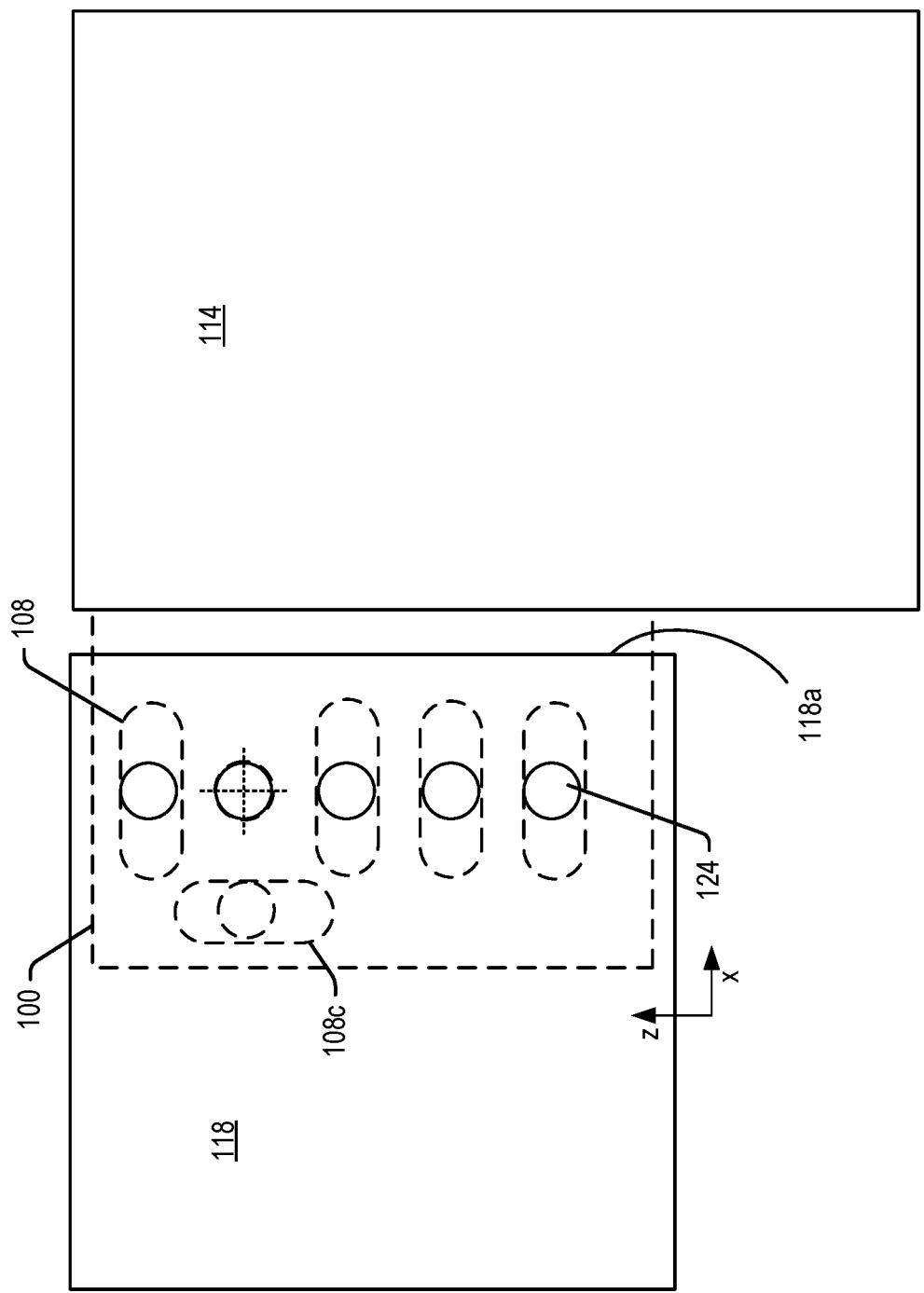
FIG. 5 depicts a front view of first and second structural members affixed to each other by a knife plate in accordance with embodiments of the present technology.

The perspective and front views of FIGS. 4 and 5, respectively, show the dowels 124 inserted through the holes 108 and 128 in the knife plate and second structural member 118 to complete the connection of the first and second structural members 114, 118 using knife plate 100. The dowels 124 may be formed of 0.8 inch steel, though they may be formed of other diameters and materials in further embodiments. The dowels have a length which may be slightly less than, equal to or greater than a width of the second structural member 118 (perpendicular to side 118b), though the dowels may be longer or shorter than that in further embodiments. The dowels 124 may be tight fit dowels, fitting snugly within holes 128. However, in further embodiments, a plate or other cover may be provided over the holes 128 at least in side 118b, to prevent axial movement of the dowels within holes 128.

As noted above, the holes 128 in the second member 118 may match in number and position to the holes 108 formed in the second section 104, but the holes 118 may be circular instead of oblong as in some of the holes 108. Thus, the holes 108 align with the holes 128 upon insertion of the second section 104 into slot 120. In one embodiment, the holes 108 in the second section 104 comprise a single circular hole 108a (FIG. 1), and a number of oblong or arcuate holes 108b. In the embodiment shown, there are four oblong holes 108, with the circular hole 108a positioned as the second hold from the top of knife plate 100. However, there may be more or less oblong holes 108b, and the circular hole 108a may be positioned in other positions along the column of holes 108. The slots 108b above and below the central round hole provide real 'pinned' behavior during the rotations expected to occur during seismic and other loads. Even if the slots were replaced with just round holes, this is still considered a pinned connection for small rotations at the connection of the second member to the first member due to gravity.

Figure 6:
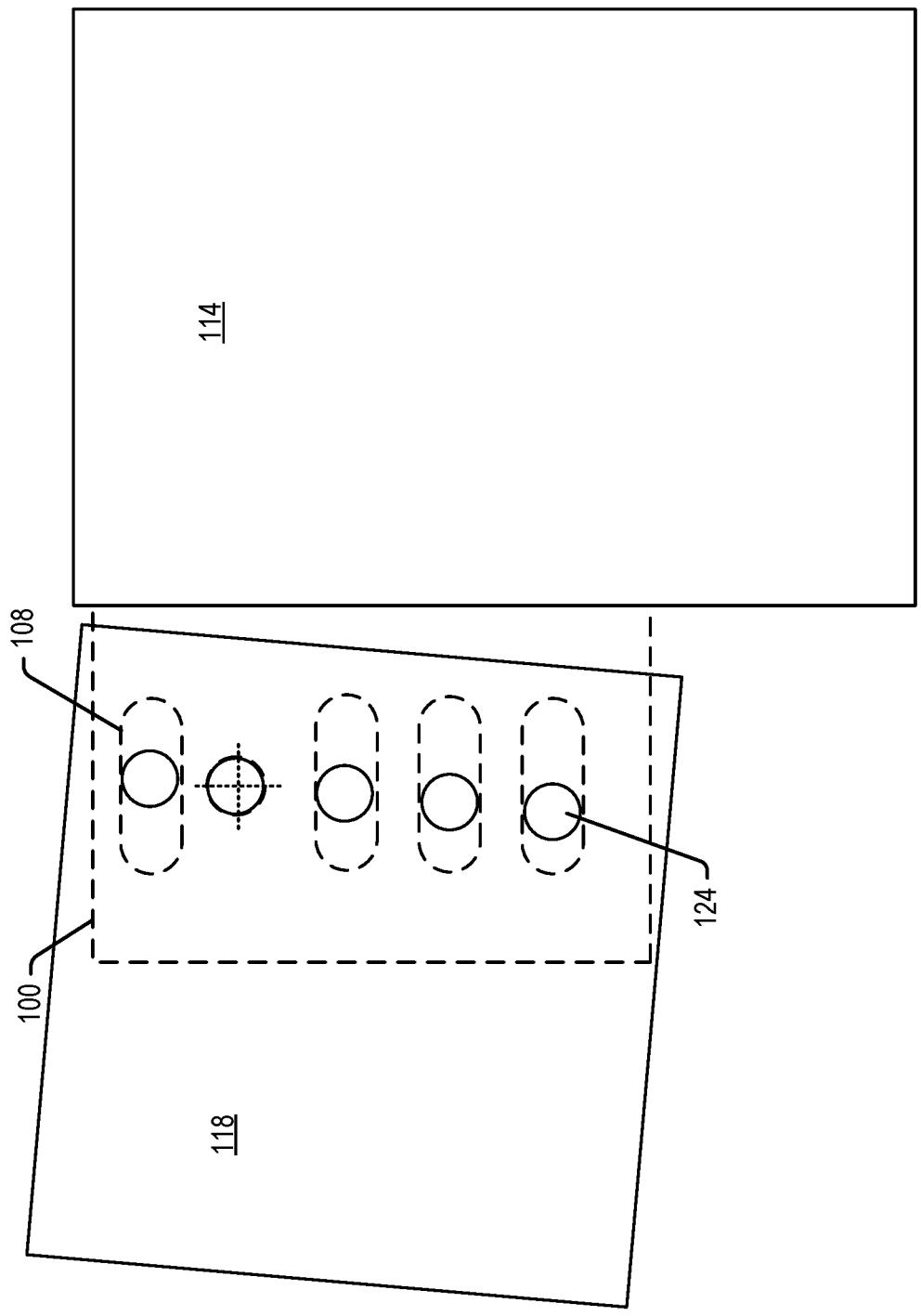

As shown in the front view of FIG. 5, the single circular hole 108a supports the end of the second member 118 against the force of gravity, and prevents axial movement of the second member 118 relative to the knife plate 100 and first member 114. As shown in the front views of FIGS. 6 and 7, the single circular hole 108a also defines an axis of rotation of the second structural member 118 relative to the first structural member upon seismic or other moment-inducing loads. The oblong holes 108 support the end of the second member 118 against the force of gravity, while allowing such rotation about the axis of rotation.

In embodiments, the circular hole 108a may have a diameter of 0.813 inches, and the oblong holes may have a length and width of 1.563 inches and 0.813, respectively. These dimensions are by way of example only and may vary in further embodiments. The uppermost hole 108b may be spaced 3 inches along the z-axis in FIGS. 1 and 5 from the top of the knife plate 100. The pair of oblong holes 108b adjacent the circular hole 108a may be spaced 2.5 inches along the z-axis from the circular hole 108a, center to center. The remaining oblong holes may be spaced along the z-axis 2.5 inches from each other, center to center. The center of hole 108a may be spaced along the x-axis 1.5 inches from the edge of the second section 104, and each of the oblong holes 108b may be centered with respect to the circular hole 108a along the z-axis. Each of these dimensions is again by way of example only and may vary in further embodiments.

As noted, the circular hole 108a may have the same diameter as the width of oblong holes 108b. As such, each of the dowels 124 may have the same diameter. In further embodiments, given that the circular hole 108a undergoes greater loads than do the oblong holes, the circular hole 108a may have a larger diameter than the width of holes 108b. In such embodiments, the dowel 124 used in the circular hole 108a may have a larger diameter than the dowels 124 used in the oblong holes.

In a further embodiment, one or more oblong slots may be vertically oriented, positioned to one or both sides of circular hole 108a and centered on the circular hole 108a along the x-axis. One such vertically oriented slot 108c is shown in phantom in FIG. 5. Such vertically oriented slots 108c may resist axial movement of the second member 118, while allowing rotation of the second member 118 about circular hole 108a. It is conceivable in further embodiments that all oblong slots 108b, 108c be omitted in favor of a single circular hole 108a. Such a single circular hole 108a may have a larger diameter, to support a larger diameter dowel, than described above.

As described above and as shown in the front views of FIGS. 6 and 7, the holes 108 support second member against the force of gravity and axial loads, while at the same time providing a true pinned connection allowing rotation of the second structural member 118 relative to the first structural member. Such a pinned connection prevents transmission of moment forces from the second structural member 118 to the first structural member 114 under seismic and other shear loads. This can prevent or minimize damage to the knife plate 100, and first and/or second structural members 114, 118 under seismic and other shear loads.

As noted above, the holes 108 in knife plate 100 may provide for a space between the first and second structural members 114, 118 so that the second structural member can rotate without binding against the first structural member. In further embodiments, top and/or bottom portions of the end face 118a may be angled, or coped, to further prevent binding.

FIG. 5 is a front view of the first and second structural members 114, 118 mounted to each other by knife plate 100. As shown, the second structural member 118 may extend straight out from (90° from) the surface of the first structural member 114 to which the second structural member is attached.

In further embodiments, two examples of which is shown in FIGS. 8 and 8A, the second structural member 118 may extend at other, oblique, angles from the surface of the first structural member 114 to which the second structural member is attached. The illustrated example is non-limiting, and the second member 118 may be formed at a variety of other angles from a front view with respect to the surface of the first structural member 114 to which the second structural member is attached. In FIG. 8, the dowels 124 are in a line parallel to the end face 118a of member 118, and the oblong holes 108 have lengths perpendicular to end face 118a. In FIG. 8A, the dowels 124 are in a line perpendicular to a long axis of member 118, and the oblong holes 108 have lengths parallel to the long axis of member 118.

FIG. 9 is a top view of the first and second structural members 114, 118 mounted to each other by knife plate 100. As shown, the second structural member 118 may extend straight out from (90° from) the surface of the first structural member 114 to which the second structural member is attached. In such embodiments, the first and second sections 102, 104 of knife plate 100 may be perpendicular to each other.

In further embodiments, one example of which is shown in FIG. 10, the second structural member 118 may extend at other, oblique, angles from the surface of the first structural member 114 to which the second structural member is attached. In such further embodiments, the first and second sections 102, 104 of knife plate 100 may form oblique angles to each other. The illustrated example is non-limiting, and the second member 118 may be formed at a variety of other angles from a top view with respect to the surface of the first structural member 114 to which the second structural member is attached.

In embodiments described above, the connection between the first and second members 114, 118 may be established by affixing the knife plate 100 to the first structural member, supporting the second structural member 118 adjacent the first structural member 114 with the knife plate 100 in slot 120, and then inserting the dowels 124.

Figure 11:
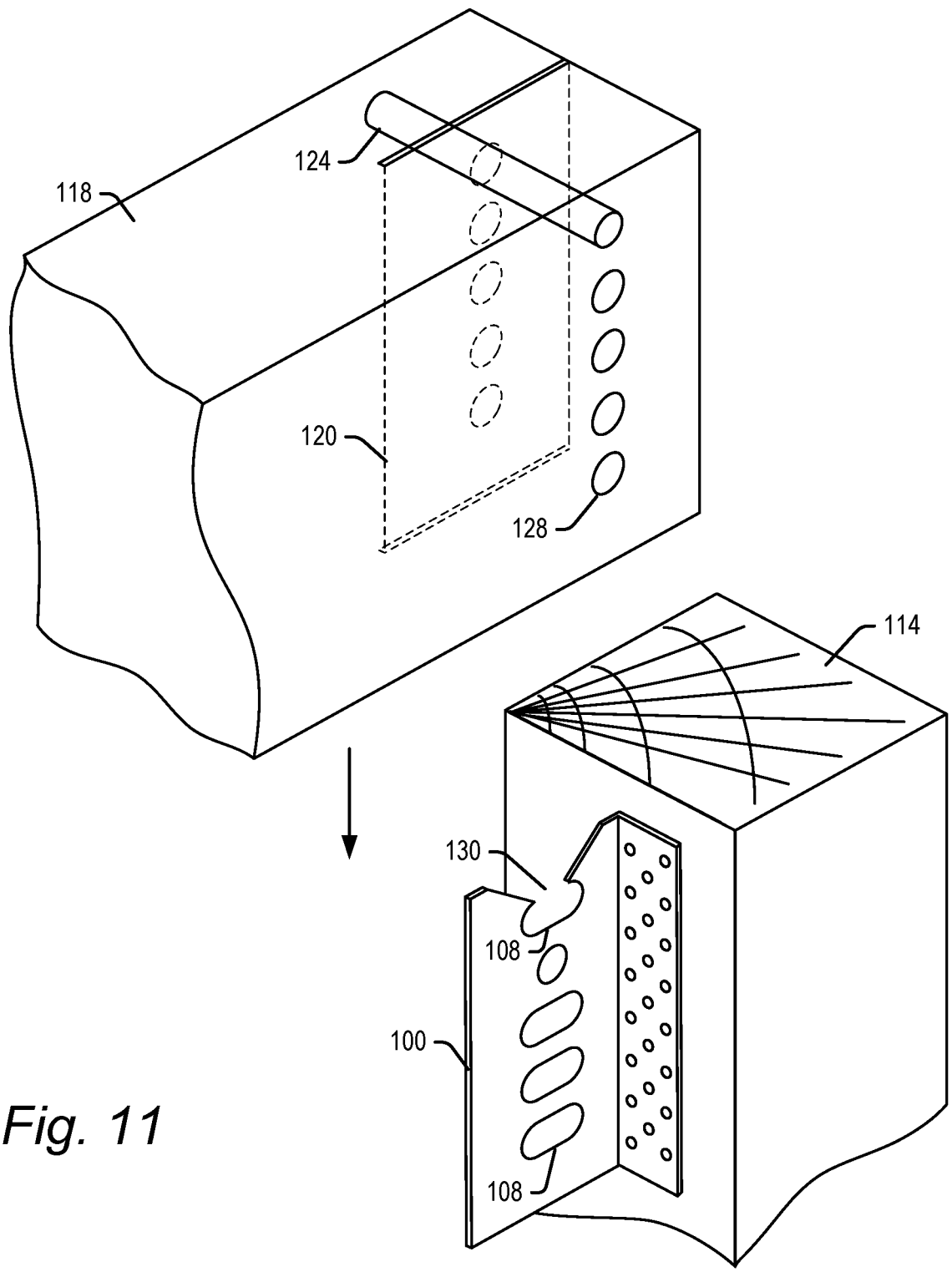
FIG. 11 depicts a perspective view of a second structural member being affixed to a knife plate in accordance with an alternative embodiment of the present technology.

In a further embodiment illustrated in the perspective view of FIG. 11, the knife plate 100 may include an open upper end 130, such that the uppermost hole 108 is open. In such embodiments, the connection between the first and second members 114, 118 may be established by affixing the knife plate 100 to the first structural member, and then lowering the second structural member into position adjacent member 114 with a dowel 124 already inserted into an uppermost hole 128.

As the second structural member is lowered, the knife plate 100 is received within slot 120 until the inserted dowel 124 enters the open end 130 and is seated within the uppermost hole 108. At that point, the second member 118 is supported on the knife plate 100 and first member 114 against gravity, and the remaining dowels may be inserted into holes 128 in the second member, through holes 108 in the knife plate 100. The sides of the open end 130 may slope to varying degrees, to assist alignment of the second member 118 as it is lowered into position adjacent the first member 114.

In embodiments described above, the knife plate 100 is configured to support a single second structural member 118 from one side of a first structural member 114. However, in further embodiments, the knife plate may be configured to support multiple second structural members on a first structural member. One such embodiment will now be described with respect to the perspective views of FIGS. 12-15. In FIGS. 12-15, elements which have the same function as those described in FIGS. 1-11 may have the same reference number but incremented by 100.

Figure 12:
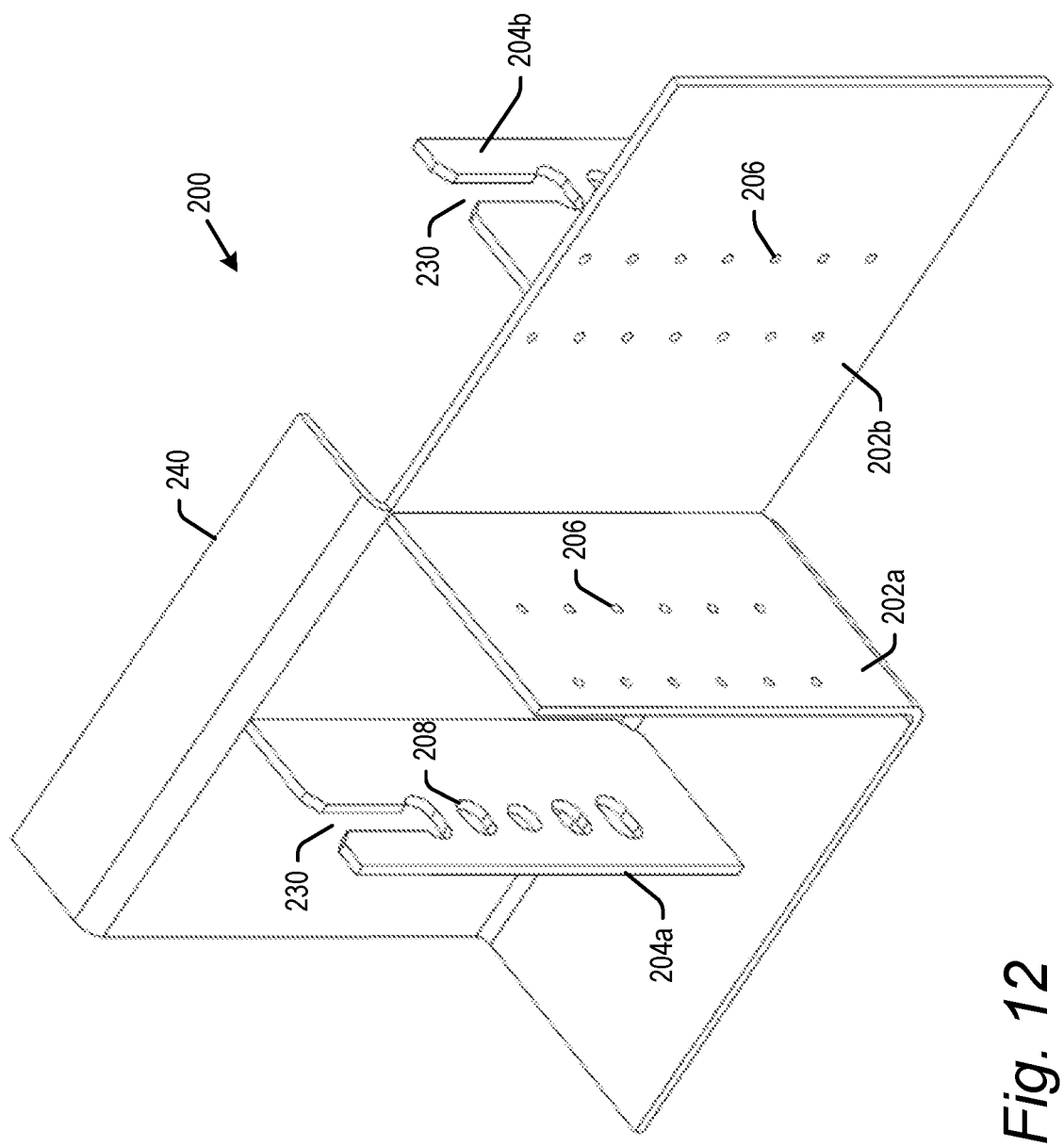
FIGS. 12 and 13 depict rear and front perspective views of a knife plate in accordance with an alternative embodiment of the present technology.
Figure 13:
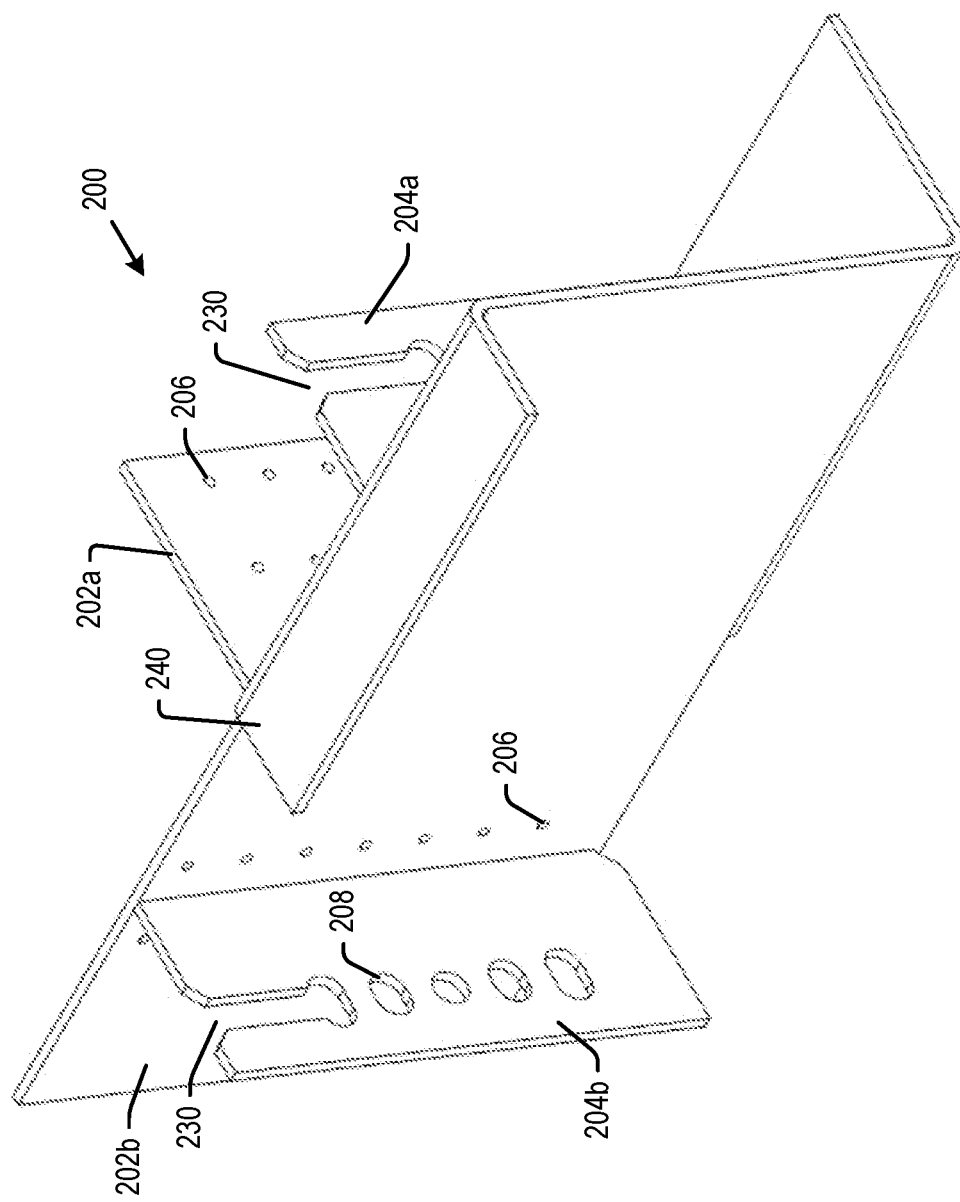
Figure 14:
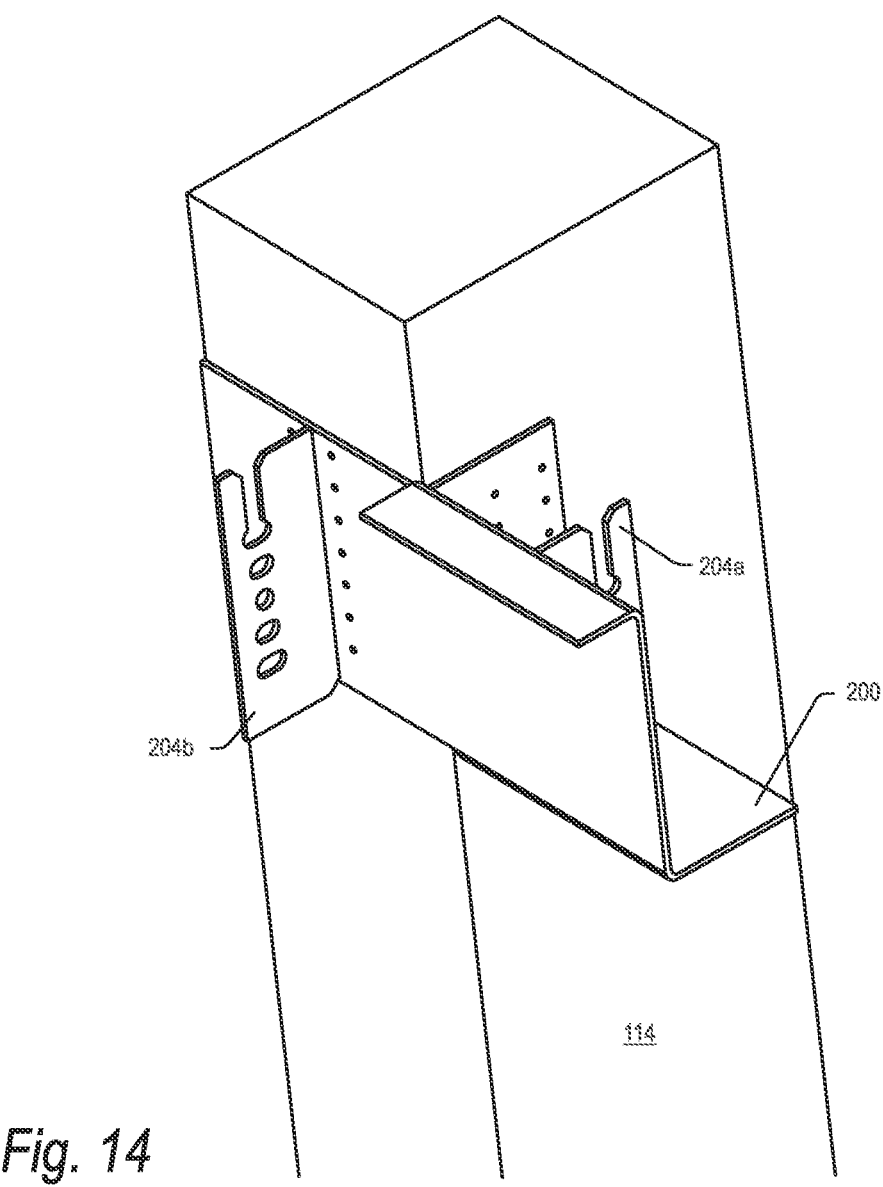
FIG. 14 depicts a perspective view of a knife plate affixed to a first structural member in accordance with the alternative embodiment of FIGS. 12 and 13.

FIGS. 12 and 13 show rear and front views of knife plate 200 configured to support multiple structural members 218 (i.e., second and third structural members 218) on a first structural member 214. As shown, the knife plate 200 may include first sections 202a, 202b including holes 206 for receiving fasteners (such as fasteners 110 of FIG. 2) to affix the knife plate 200 to the first structural member 218 as shown in FIG. 14.

Figure 15:
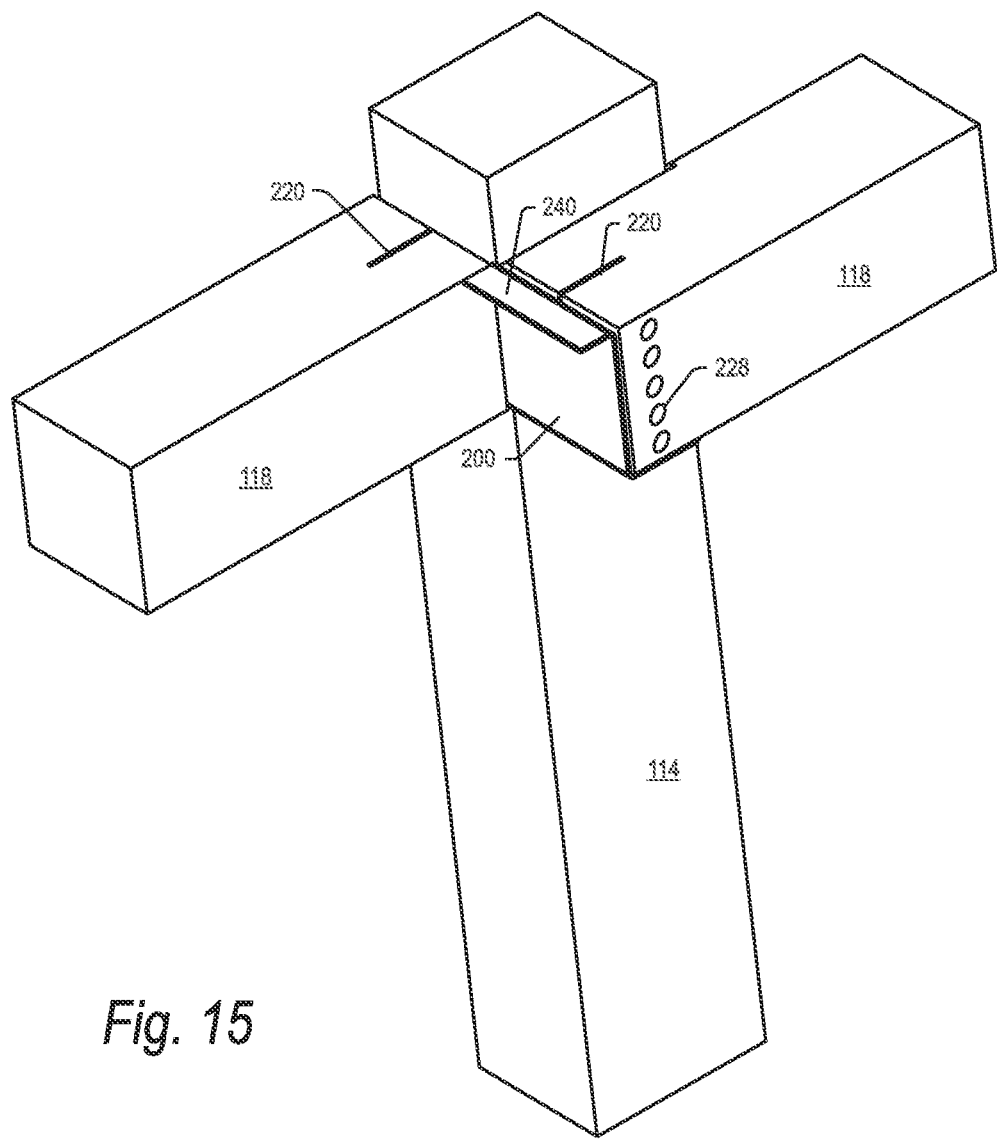
FIG. 15 depicts a perspective view of first, second and third structural members affixed to each other by a knife plate in accordance with the alternative embodiment of FIGS. 12 and 13.

The knife plate 200 may also include second sections 204a, 204b for being received within slots 220 of the second and third structural members, respectively, as shown in FIG. 15. As described above, the second sections 204a, 204b each include holes 208. Each of the second and third members 214 may also have a pattern of holes 228 matching the pattern of holes 208 in respective second sections 204a, 204b. Once positioned within the slots 220, dowels (such as dowels 124 of FIG. 3) may be inserted into holes 228 in the second and third members, and through the holes 208 of respective second sections 204a, 204b, to secure the second and third members 218 onto the knife plate 200 and first structural member 214.

As above, the knife plate and dowels support the second and third members 218 on the first member 214 with a pinned connection that allows pivoting of the second and third members with respect to the knife plate and first member 214. Such pinned connection prevents transmission of moment forces from the second/third structural members 218 to the first structural member 214 under seismic and other shear loads. This can prevent or minimize damage to the knife plate 200, and first, second and/or third structural members 214, 218 under seismic and other shear loads.

As shown in FIG. 15, the second structural member 218 has an end face (such as end face 118a of FIG. 3) adjacent the first structural member 214, while the third structural member 218 has a side surface (such as side surface 118b of FIG. 3) adjacent the first structural member 214. It is understood that the knife plate 100 of FIGS. 1-11 may be configured to support the side surface 118b of the second structural member 118 adjacent the first structural member 114.

Other configurations of knife plate 100, 200 are contemplated. For example, knife plate 200 may be modified to wrap around three surfaces of the first structural member 214 and have second sections 204a, 204b extending out from opposed surfaces of the first structural member 214. In such embodiments, the knife plate 200 may support second and third structural members 218 with end faces of each positioned adjacent opposed surfaces of the first structural member 214. In a further example, knife plate 200 may be wrap around two adjacent surfaces of the first structural member 214 and have second sections 204a, 204b extending out from the two adjacent surfaces of the first structural member 214. In such embodiments, the knife plate 200 may support second and third structural members 218 extending at right angles to each other from the first structural member 214, with end faces of each positioned at adjacent surfaces of the first structural member 214.

A stiffener 240 may be provided, for example at the side-adjacent portion of knife plate 200, to increase the strength of the knife plate 200. Additional stiffeners 240 may be added in further embodiments. Alternatively, stiffener 240 may be omitted in further embodiments.

Figure 16:
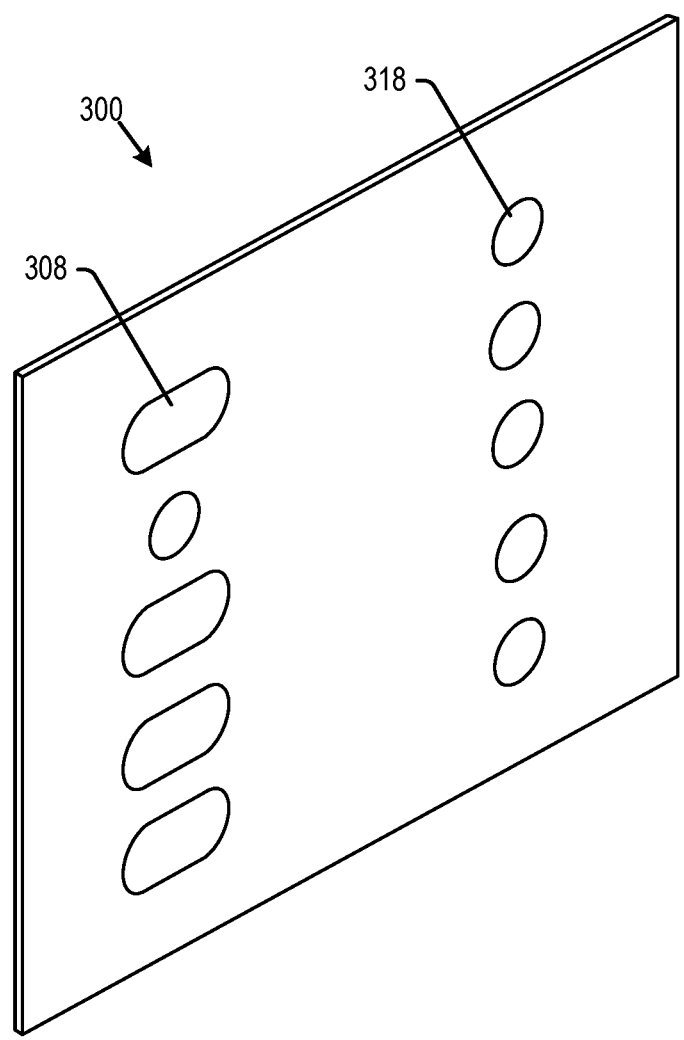
FIGS. 16 and 17 depict perspective views of a flat knife plate fitting within a slot in the first structural member according to further embodiments of the present technology.

In embodiments described above, the knife plate 100 may be formed of an angled piece of metal. In further embodiments, the knife plate 100 may instead be a flat plate, i.e., 180° between the first and second contiguous sections of the knife plate 300. Referring now to the perspective views of FIGS. 16 and 17, there is shown a knife plate 300, which may be made of the same materials as knife plate 100. Knife plate 300 may include holes 308 which may be identical in position, shape and function to holes 108 described above. In this embodiment, knife plate 300 may be a flat plate and the fastening holes 106 described above may be omitted. The knife plate 300 may include a second set of holes 318, each of which may be circular.

Figure 17:
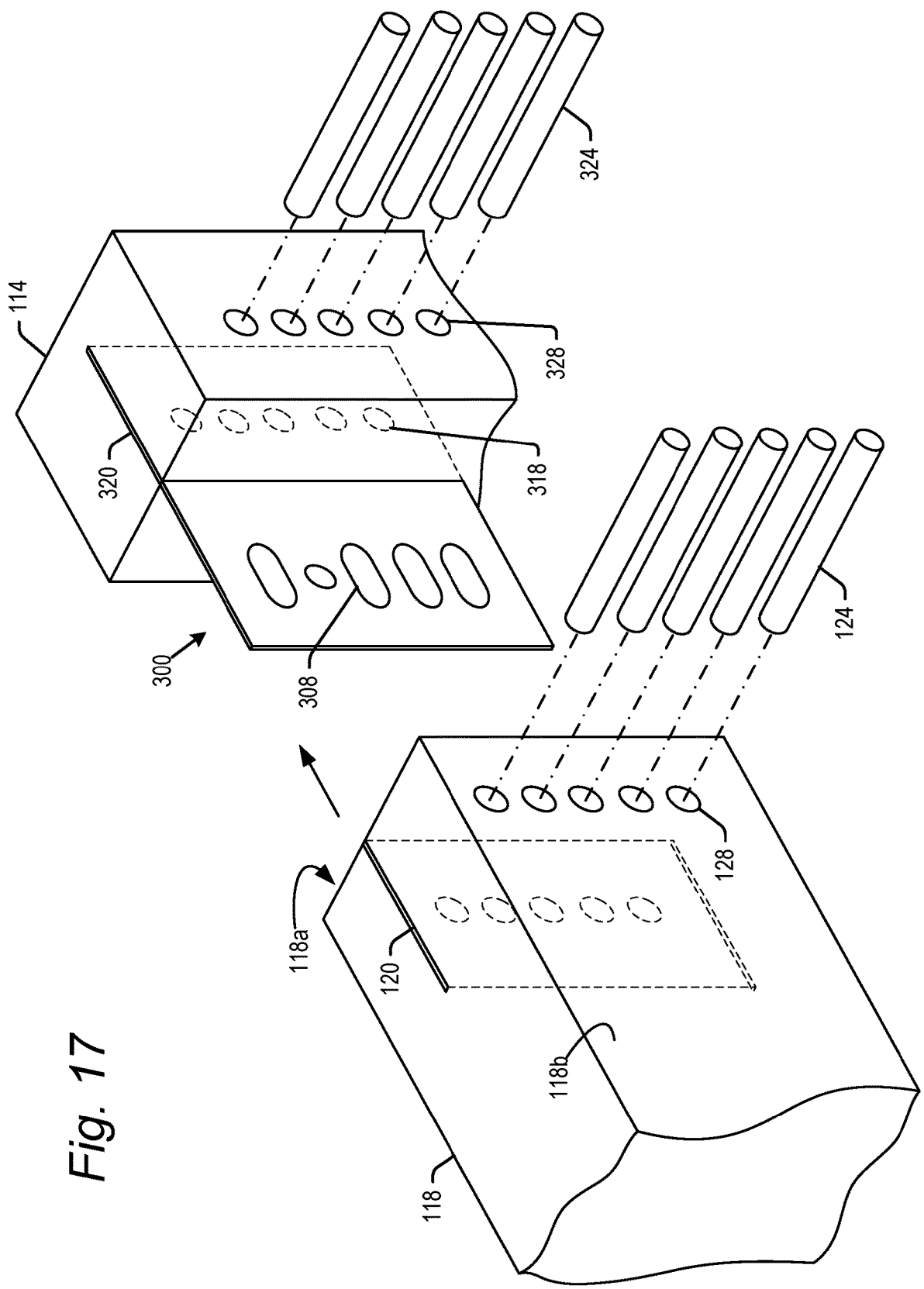

The portion of the knife plate 300 including holes 318 may be configured to fit within a slot 320 formed in the first structural member 114, as shown in FIG. 17. In this embodiment, the first structural member 114 may further include holes 328 for receiving dowels 324. The dowels 324 fit through holes 328 in the first member 114, and though holes 318 in knife plate 300, to affix the knife plate 300 to the first structural member 114. Thereafter, the portion of the knife plate 300, including holes 308, protruding from the first structural member may be used to affix the second structural member 118 to the knife plate 300 and first structural member 118 as described above.

Figure 18:
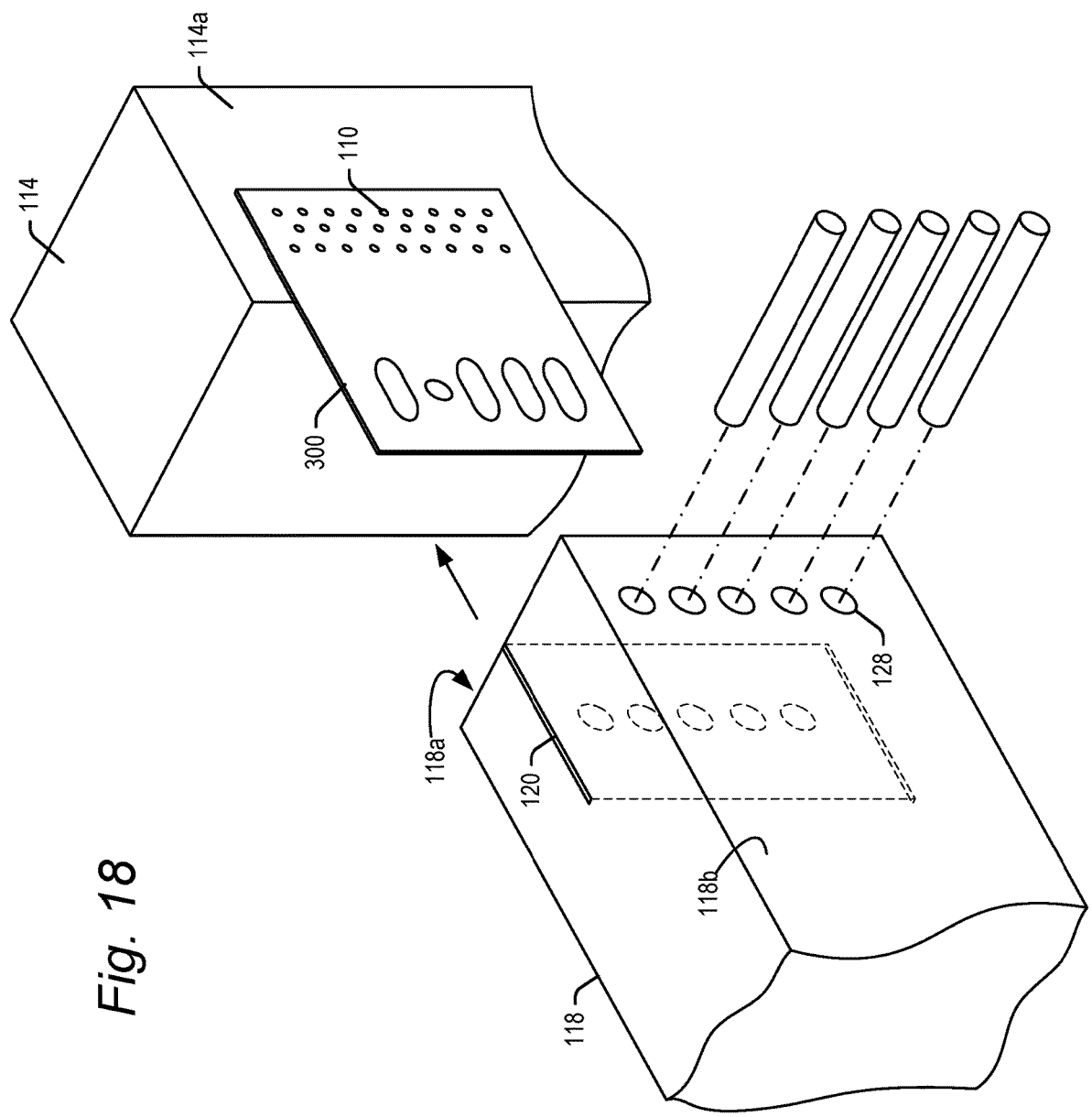
FIG. 18 depicts a perspective view of a flat knife plate fitting on a side surface of the first structural member according to further embodiments of the present technology.
Figure 19:
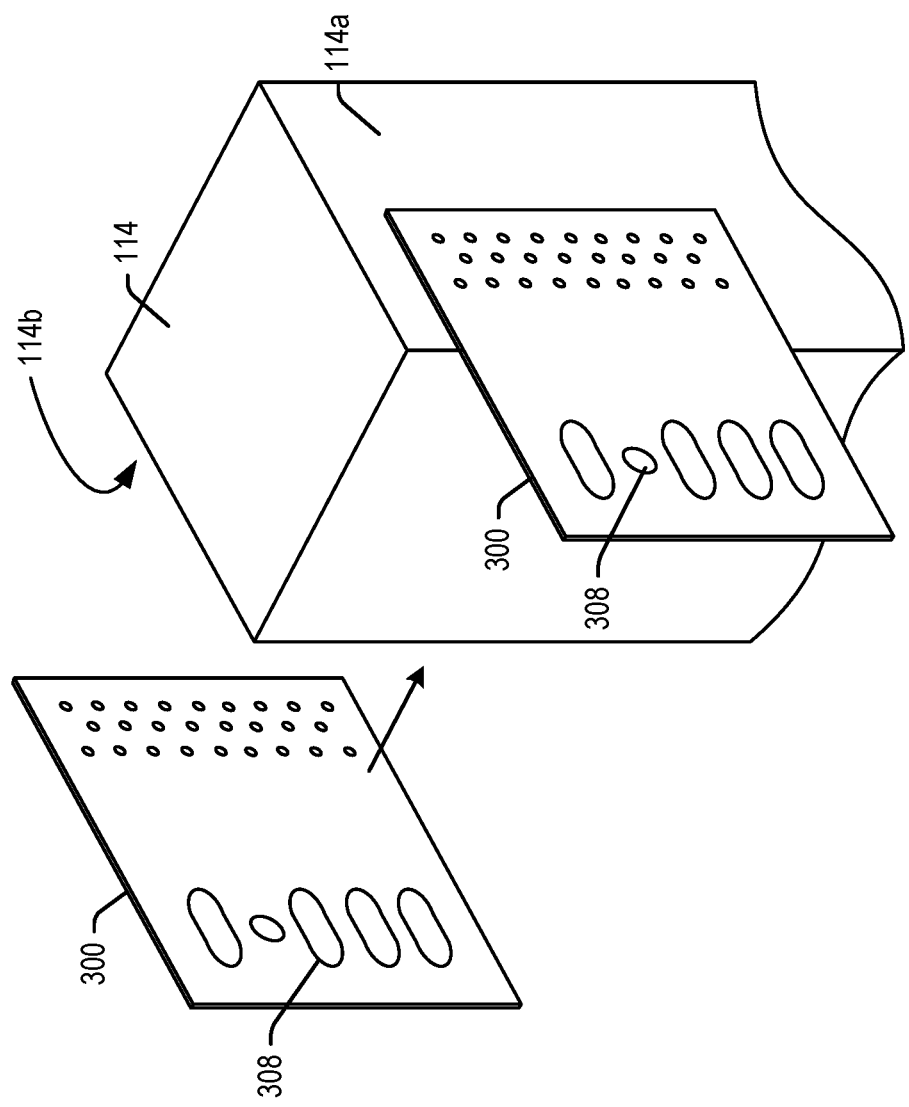
FIGS. 19-21 depict perspective views of a pair of flat knife plates fitting on opposed side surfaces of the first structural and second structural members according to further embodiments of the present technology.

In a further embodiment, instead of affixing within a slot 320 in the first structural member 114, the flat knife plate 300 may affix to a surface 114a of the first member 114, as shown in the perspective view of FIG. 18. In such embodiments, the holes 328 and dowels 324 of FIG. 17 may be omitted, and the knife plate 300 may be affixed to surface 114a using fasteners such as fasteners 110 described above with respect to FIG. 2.

FIGS. 19-22 show a further embodiment of the present technology comprising a pair of flat knife plates 300 on opposed surfaces of the first and second structural members 114 and 118. As shown in the perspective view of FIG. 19, the knife plates 300 may affix to surfaces 114a and 114b of the first structural member 114 as by fasteners 110.

Figure 20:
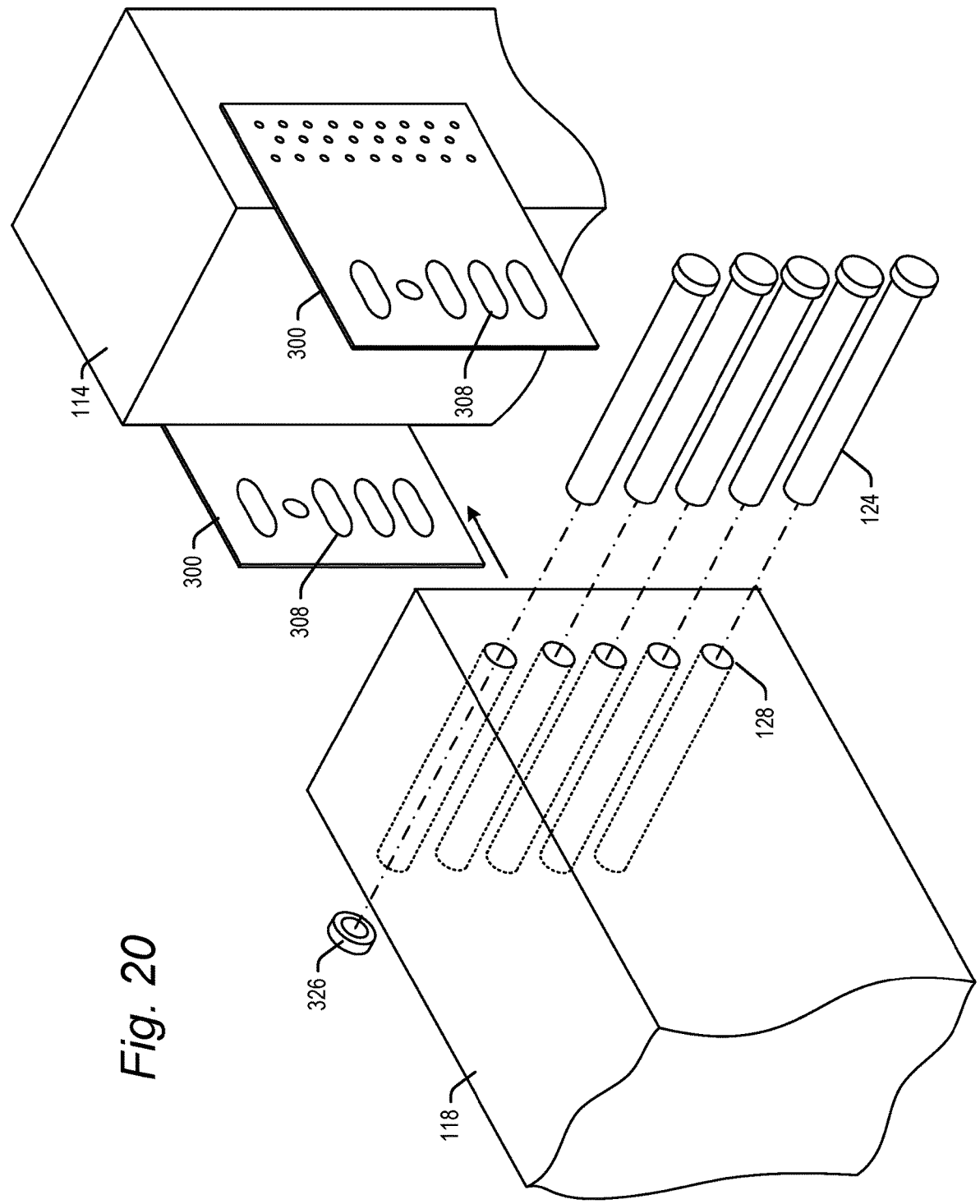
Figure 21:
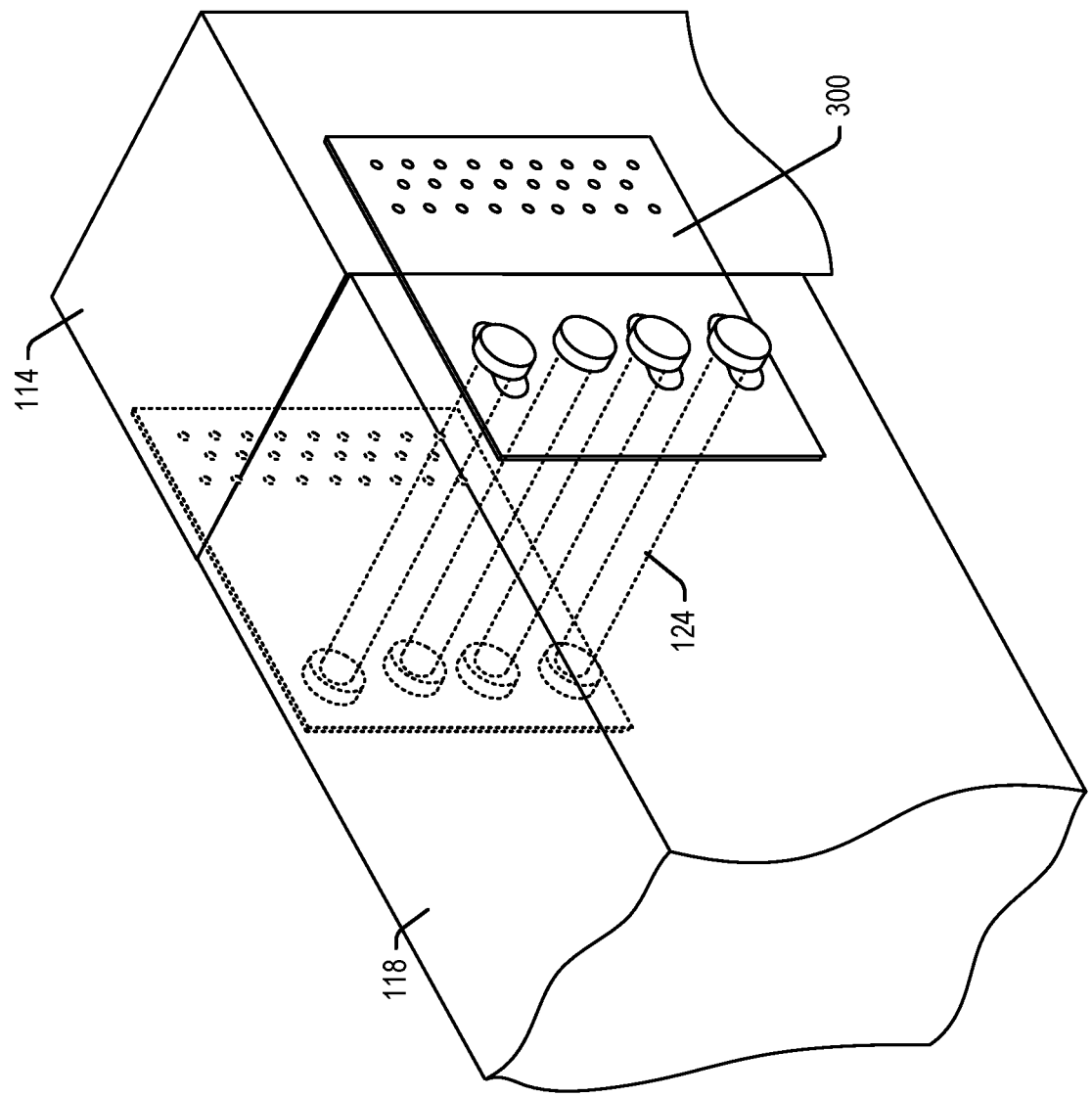
Figure 22:
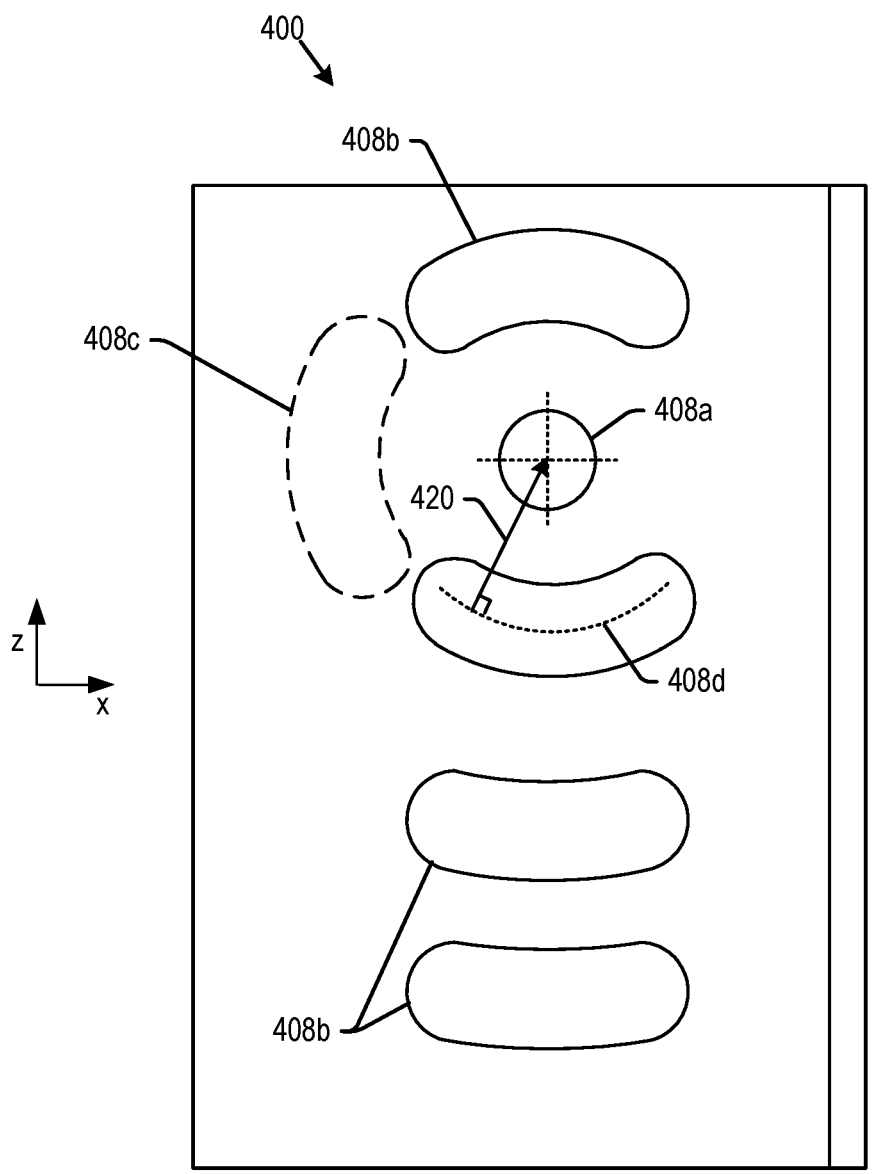
FIG. 22 depicts a front view of a knife plate including radiused slots according to an alternative embodiment of the present technology.

Thereafter, the second structural member 114 may be affixed to the knife plates 300 and the first structural member 114 by one or more dowels 124 as shown in the perspective views of FIGS. 20 and 21. In this embodiment, once the second member 118 is positioned, the one or more dowels 124 may fit through the first knife plate 300, through holes 128 in the second structural member 118, and then through the second knife plate 300. In this embodiment, the one or more dowels 124 may be bolts, that receive a nut 326 (only one of which is shown in FIG. 20). As described above, one of the holes 308 in the knife plates 300 may be circular (the same corresponding hole in each knife plate 300), while the remaining holes may be oblong. Thus, the knife plates 300 according to this embodiment support the second structural member 118 on the first structural member without transferring moment forces from the second structural member 118 to the first structural member 114, as described above.

In embodiments described above, the holes 108b in knife plate 100 around circular hole 108a may have oblong shapes which are straight along their lengths. In a further embodiment, the slots around the circular hole 108a may be radiused along their lengths. Such an embodiment is shown in knife plate 400 of FIG. 22. As shown, the knife plate 400 may include a circular hole 408a as in hole 108a described above, and a number of radiused slots 408b. The slots 408b may be arrayed along the z-axis, but may also be arrayed along the x-axis, as in the radiused slot 408c, shown in dashed lines. The radius of curvature of each slot 408b, 408c may be equal to the distance from the circular hole 408a to the radiused slot, center to center. A ray 420 perpendicular to any point along the curved length of a slot 408b (shown by dashed line 408d) may pass through a center of the circular hole 408a.

Figure 23:
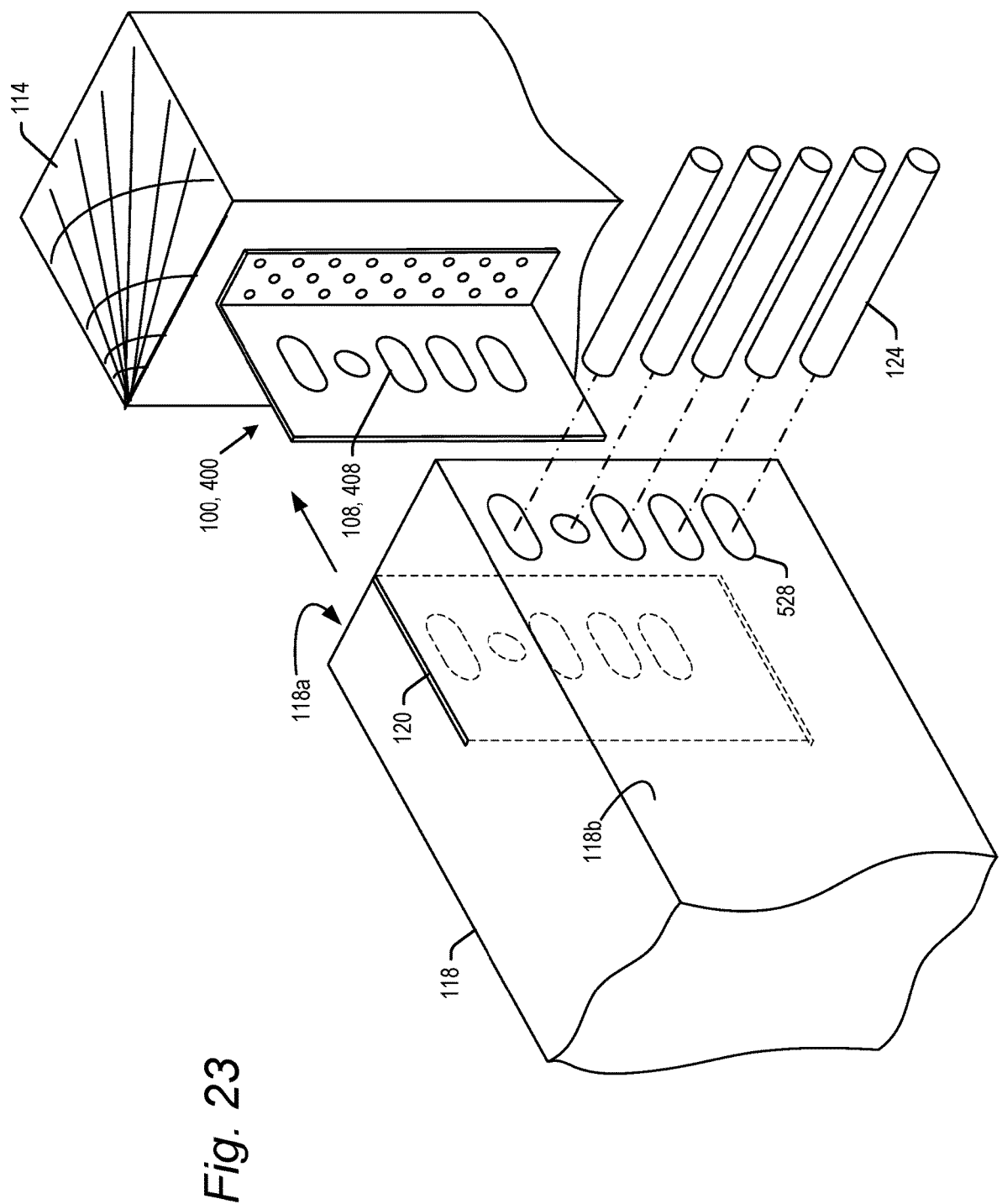
FIG. 23 depicts a perspective view of a second structural member having oblong holes for receiving dowels according to further embodiments of the present technology.

In embodiments described above, the holes 128 formed in the second structural member 118 may be circular, to provide a tight fit around dowels 124. In a further embodiment shown in FIG. 23, holes in the second structural member 118 around the circular hole (holes 528 in FIG. 23) may be oblong. The oblong shape of holes 528 may match the number, position and shape of slots 108, 408 formed in the knife plate 100, 400.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A system for securing a first structural member to a second structural member in a construction, the second structural member having one or more holes, the system comprising:
   a first section specifically made to be affixed to the first structural member; and
   a second section, formed contiguous with the first section, and specifically made to be inserted into a slot in the second structural member and to receive one or more dowels through one or more holes in the second section and the second structural member, the second section and one or more dowels specifically made to support the second structural member on the first structural member without transferring moment forces from second structural member onto the first structural member; and
   wherein the one or more dowels are specifically made to fit through the one or more holes in the second structural member and the one or more holes in the second section to support the second structural member on the first structural member with a space between the first and second structural members, the space allowing rotation of the first structural member relative to the second structural member.

2. The system of claim 1, wherein the first and second sections are formed at right angles to each other.

3. The system of claim 1, wherein first and second sections are integrally formed with each other.

4. The system of claim 1, wherein the one or more holes comprise a plurality of holes in the second section.

5. The system of claim 4, wherein the plurality of holes comprise a circular hole specifically made to receive a dowel and specifically made to be an axis about which the second structural member rotates relative to the first structural member.

6. The system of claim 5, the circular hole supporting the second structural member against axial movement and against gravitational forces.

7. The system of claim 4, wherein the plurality of holes further comprise one or more oblong holes specifically made to receive one or more of the dowels.

8. The system of claim 7, wherein the one or more oblong holes are straight along their length.

9. The system of claim 7, wherein the one or more oblong holes are radiused along their length.

10. The system of claim 7, wherein the one or more oblong holes are oriented parallel to a long axis of the second structural member and specifically made to support the second structural member against gravitational forces.

11. The system of claim 7, wherein the one or more oblong holes are oriented perpendicularly to a long axis of the second structural member and specifically made to support the second structural member against axial movement.

12. A system within a construction, comprising:
a first structural member;
a second structural member comprising an end face, a slot provided in the second structural member through the end face and one or more holes formed a first distance from the end face;
a knife plate for pinning the first and second structural members to each other, the knife plate comprising:
a first section specifically made to be fastened to the first structural member, and
a second section specifically made to fit within the slot in the second structural member and comprising at least one hole formed at a second distance from the first section; and
one or more dowels specifically made to fit through the one or more holes in the second structural member and the at least one hole in the second section, the one or more dowels and second section specifically made to pin the second structural member to the knife plate and first structural member without transferring moment forces from second structural member onto the first structural member; and
wherein the first distance is greater than the second distance to provide a space between the end face of the second structural member and the first structural member when the second section is mounted on the knife plate, the space enabling rotation of the second structural member relative to the first structural member.

13. The system of claim 12, wherein one of the first and second structural members comprises a column, beam, joist, stud, girder, chord, truss, shear wall or frame.

14. The system of claim 12, wherein the at least one hole in the second section comprises a plurality of holes.

15. The system of claim 14, wherein the plurality of holes comprise a circular hole specifically made to receive a dowel of the one or more dowels, and specifically made to be an axis about which the second structural member rotates relative to the first structural member.

16. The system of claim 15, the circular hole supporting the second structural member against axial movement and against at least gravitational forces.

17. The system of claim 14, wherein the plurality of holes further comprise one or more oblong holes specifically made to receive one or more of the dowels.

18. The system of claim 17, wherein the one or more oblong holes are straight along their length.

19. The system of claim 17, wherein the one or more oblong holes are radiused along their length.

20. The system of claim 17, wherein the one or more oblong holes are oriented parallel to a long axis of the second structural member and specifically made to support the second structural member against gravitational forces.

21. The system of claim 17, wherein the one or more oblong holes are oriented perpendicularly to a long axis of the second structural member and specifically made to support the second structural member against axial movement.

22. A system within a construction, comprising:
a first structural member;
a second structural member comprising multiple holes;
a knife plate for pinning the first and second structural members to each other, the knife plate comprising:
a first section specifically made to be fastened to the first structural member, and
a second section comprising a plurality of holes, the plurality of holes comprising
a circular hole and one or more oblong holes; and
a plurality of dowels specifically made to fit through the multiple holes in the second structural member and the plurality of holes in the second section, the plurality of dowels in the multiple holes and plurality of holes supporting the second structural member on the knife plate and first structural member while allowing rotation of the second structural member relative to the knife plate and first structural member.

23. The system of claim 22, wherein the one of the plurality of holes in the second section is open to a top edge of the knife plate.

24. The system of claim 22, wherein the first and second structural members are formed of wood.

25. The system of claim 24, wherein the wood comprises natural wood, composite wood and engineered lumber.

26. The system of claim 22, wherein the first and second sections are formed at oblique angles with respect to each other.

27. The system of claim 22, wherein the first and second sections are formed at 180° to each other, such that the knife plate is a flat plate.

28. A system within a construction, comprising:
a first structural member;
a second structural member comprising multiple holes;
a knife plate for pinning the first and second structural members to each other, the knife plate comprising:
a first section specifically made to be fastened to the first structural member, and
a second section comprising a plurality of holes, the plurality of holes comprising a circular hole and two or more oblong holes, each of the two or more oblong holes having a length, and a center point midway along the length, a straight line through the center points of the two or more oblong holes passing through an axis of rotation of the circular hole; and a plurality of dowels specifically made to fit through the multiple holes in the second structural member and the plurality of holes in the second section, the plurality of dowels in the multiple holes and plurality of holes supporting the second structural member on the knife plate and first structural member while allowing rotation of the second structural member relative to the knife plate and first structural member.

29. The system of claim 28, wherein the one of the plurality of holes in the second section is open to a top edge of the knife plate.

30. The system of claim 28, wherein the first and second structural members are formed of wood.

31. The system of claim 30, wherein the wood comprises natural wood, composite wood and engineered lumber.

32. The system of claim 28, wherein the first and second sections are formed at oblique angles with respect to each other.

33. The system of claim 28, wherein the first and second sections are formed at 180° to each other, such that the knife plate is a flat plate.

34. A system for securing a first structural member to a second structural member in a construction, the second structural member having one or more holes, the system comprising:

a first section specifically made to be affixed to the first structural member; and a second section, formed contiguous with the first section, and specifically made to be inserted into a slot in the second structural member, the second section having one or more holes specifically made to be aligned with the one or more holes in the second structural member upon insertion of the second section into the slot in the second structural member;

wherein the second structural member and the second section are specifically made to receive one or more dowels having a diameter equal to or smaller than diameters of the one or more holes in the second structural member and the one or more holes in the second section, the second section and one or more dowels specifically made to support the second structural member on the first structural member without transferring moment forces from second structural member onto the first structural member.

35. The system of claim 34, wherein the first and second sections are formed at right angles to each other.

36. The system of claim 34, wherein the one or more holes comprise a plurality of holes in the second section.

37. The system of claim 36, wherein the plurality of holes comprise a circular hole specifically made to receive a dowel and specifically made to be an axis about which the second structural member rotates relative to the second section.

38. The system of claim 37, wherein the plurality of holes further comprise one or more oblong holes specifically made to receive one or more of the dowels, the one or more oblong holes being oriented in a circle having the circular hole as its center so that the one or more oblong holes allow rotation of the second structural member relative to the second section.

39. The system of claim 5, wherein the plurality of holes further comprise one or more oblong holes specifically made to receive one or more of the dowels, the one or more oblong holes being oriented in a circle having the circular hole as its center so that the one or more oblong holes allow rotation of the second structural member relative to the second section.

* * * * *